(12) United States Patent
Yanagisawa

(10) Patent No.: US 12,208,962 B2
(45) Date of Patent: Jan. 28, 2025

(54) WAREHOUSE SYSTEM

(71) Applicant: KABUSHIKI KAISHA TOYOTA JIDOSHOKKI, Kariya (JP)

(72) Inventor: Hideo Yanagisawa, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 754 days.

(21) Appl. No.: 17/293,767

(22) PCT Filed: Nov. 11, 2019

(86) PCT No.: PCT/JP2019/044074
§ 371 (c)(1),
(2) Date: May 13, 2021

(87) PCT Pub. No.: WO2020/100796
PCT Pub. Date: May 22, 2020

(65) Prior Publication Data
US 2021/0403236 A1 Dec. 30, 2021

(30) Foreign Application Priority Data
Nov. 14, 2018 (JP) .................................. 2018-213579

(51) Int. Cl.
*B65G 1/04* (2006.01)
*B65G 47/82* (2006.01)

(52) U.S. Cl.
CPC ........... *B65G 1/0485* (2013.01); *B65G 47/82* (2013.01)

(58) Field of Classification Search
CPC ................................................. B65G 1/0485
See application file for complete search history.

(56) References Cited

U.S. PATENT DOCUMENTS 3,240,365 A * 3/1966 King .................. B65G 1/06
414/280
9,254,958 B2 * 2/2016 De Vries .............. B65G 1/0407
(Continued)

FOREIGN PATENT DOCUMENTS

GB 1 473 317 A 5/1977
JP 09-272609 A 10/1997
(Continued)

OTHER PUBLICATIONS

Extended European Search Report issued Nov. 26, 2021 in European Application No. 19884260.1.

*Primary Examiner* — Mark C Hageman
(74) *Attorney, Agent, or Firm* — Sughrue Mion, PLLC

(57) ABSTRACT

A warehouse system includes a first moving unit configured to move articles in an extending direction of a storage rack on the storage rack; a second moving unit configured to be operated independently from the first moving unit and to move selected articles toward an exit side on a transfer rack; and a third moving unit configured to be operated independently from the first moving unit and the second moving unit and to transfer the selected articles from the storage rack to the transfer rack. The third moving unit includes a pushing device configured to push the selected articles toward the transfer rack; a guide device configured to guide the pushing device in the extending direction of the storage rack; and a control device configured to control the pushing device and the guide device.

8 Claims, 11 Drawing Sheets

(56) References Cited

U.S. PATENT DOCUMENTS

| | | | |
|---|---|---|---|
| 9,340,355 B2 * | 5/2016 | De Vries | ............... B65G 1/0478 |
| 9,688,479 B1 | 6/2017 | Gorski | |
| 10,934,091 B1 * | 3/2021 | Kalm | ................... B65G 1/1376 |

FOREIGN PATENT DOCUMENTS

| | | | | |
|---|---|---|---|---|
| JP | 2006321595 A | * | 11/2006 | ............. B65G 1/137 |
| JP | 2009-120317 A | | 6/2009 | |
| JP | 2013-103822 A | | 5/2013 | |
| JP | 2015-044664 A | | 3/2015 | |
| WO | 2008/140293 A1 | | 11/2008 | |

* cited by examiner

WAREHOUSE SYSTEM

CROSS-REFERENCE TO RELATED APPLICATIONS

This application is a National Stage of International Application No. PCT/JP2019/044074 filed Nov. 11, 2019, claiming priority based on Japanese Patent Application No. 2018-213579 filed Nov. 14, 2018, the contents of all of which are incorporated herein by reference in their entirety.

TECHNICAL FIELD

The present invention relates to a warehouse system.

BACKGROUND ART

Conventionally, various warehouse systems have been proposed for carrying in and storing a plurality of articles and carrying out selected articles that are to be carried out, from among the stored articles. For example, a warehouse system disclosed in Patent Document 1 includes a pair of storage racks disposed horizontally and facing each other, and a stacker crane. Each of the storage racks is formed by a plurality of support posts, a plurality of horizontal side members, and a plurality of braces. These support posts, horizontal side members, and braces form a plurality of storage portions in each of the storage racks. The storage portions are arranged in a grid, and each of the storage portions is configured to store therein an article.

The stacker crane is disposed between the storage racks that face each other. The stacker crane has a travel cart configured to travel along a width direction of the storage racks, a lift platform that is movable in a height direction of the storage racks with an article placed thereon, and slide forks that are attached to the lift platform so that the slide forks can extend from and retract into the lift platform.

In the warehouse system, when carrying an article into the storage racks, a worker places an article to be carried in on the lift platform. Then, the worker operates the stacker crane to move the lift platform to a position of a storage portion in which no article is stored. After that, the worker causes the slide forks to extend so that the article placed on the lift platform is stored in the storage portion. When carrying out a selected article, on the other hand, the worker operates the stacker crane to move the lift platform to a position of a storage portion in which the selected article is stored. After that, the worker causes the slide forks to extend to place the selected article stored on the storage portion on the lift platform. In this way, the selected article is transferred by the stacker crane.

CITATION LIST

Patent Document

Patent Document 1: Japanese Patent Application Publication No. 2013-103822

SUMMARY OF INVENTION

Technical Problem

However, in the conventional warehouse system described above, in order to store an article in a storage portion and to take out a selected article from a storage portion, the stacker crane is moved to the position of the target storage portion. Therefore, in the warehouse system, it is not possible to perform a carrying-out operation of a selected article while a storing operation of articles is performed using the stacker crane, so that the efficiency of the storing operation and the carrying-out operation is low.

In view of this, it may be conceived to use a plurality of stacker cranes so that the storing operation of articles and the carrying-out operation of selected articles are performed separately using the stacker cranes separately. In this case, however, costs for the warehouse system rises.

The present invention has been made in view of the conventional situation above, and it is an object to be solved by the invention to provide a warehouse system in which a storing operation of articles and a carrying-out operation of selected articles can be performed highly efficiently and that can achieve cost reduction.

Solution to Problem

A first warehouse system of the present invention is a warehouse system in which a plurality of articles is carried in and stored, and from which selected articles that are to be carried out are carried out, the selected articles being the articles that are selected from among the stored articles, the first warehouse system including:
an entrance through which the articles are carried in;
an exit through which the selected articles are carried out;
a storage rack that extends from an entrance side toward an exit side and on which the articles are stored;
a transfer rack that is disposed next to the storage rack, extends from the entrance side toward the exit side in parallel to the storage rack, and on which the selected articles are to be placed;
a selection unit that is configured to select the selected articles from among the articles stored on the storage rack;
a first moving unit that is configured to move the articles in an extending direction of the storage rack on the storage rack;
a second moving unit that is configured to be operated independently from the first moving unit and to move the selected articles toward the exit side on the transfer rack; and
a third moving unit that is configured to be operated independently from the first moving unit and the second moving unit and to transfer the selected articles from the storage rack to the transfer rack.

The first warehouse system is characterized in that the third moving unit includes a pushing device configured to push the selected articles toward the transfer rack;
a guide device configured to guide the pushing device in the extending direction of the storage rack; and
a control device configured to control the pushing device and the guide device.

In the first warehouse system of the present invention, the articles that are carried in through the entrance are sequentially stored on the storage rack by moving the articles toward the exit side on the storage rack by the first moving unit. Then, the selection unit selects the selected articles from among the articles stored on the storage rack. With this, the third moving unit transfers the selected articles from the storage rack to the transfer rack. Then, the selected articles are moved toward the exit side on the transfer rack by the second moving unit. In this way, the selected articles are sequentially carried out through the exit.

In the warehouse system, the first moving unit, the second moving unit, and the third moving unit are operated independently from one another. Therefore, the moving of the articles on the storage rack by the first moving unit, the moving of the selected articles on the transfer rack by the second moving unit, and the transfer of the selected articles from the storage rack to the transfer rack by the third moving unit may be performed independently from one another. With the configuration of the warehouse system, the storing operation of the articles that are carried in through the entrance and the carrying-out operation of the selected articles may be performed simultaneously without using a plurality of stacker cranes or similar devices.

Therefore, according to the first warehouse system of the present invention, it is possible to perform the storing operation of articles and the carrying-out operation of selected articles highly efficiently and to achieve cost reduction.

In particular, in the warehouse system, the third moving unit includes the pushing device and the guide device, and the control device. Furthermore, the guide device guides the pushing device in the extending direction of the storage rack, so that the pushing device is moved in the extending direction of the storage rack to the position of the selected article. Therefore, the third moving unit need not have the pushing devices of the same number as the number of articles to be stored on the storage rack. In this regard also, it is possible to achieve cost reduction with the warehouse system.

The pushing device may include a device body mounted to the guide device, and a rod that is disposed in the device body, extendable in an axial direction, and configured to push the selected articles. The rod is extendable and retractable between a first length and a second length that is greater than the first length. The rod preferably pushes a selected article while extending to the second length. In this case, the configuration of the pushing device is simplified, so that the cost for the pushing device may be reduced.

The pushing device may also include a device body mounted to the guide device, and a first chain and a second chain that are disposed in the device body. It is also preferable that the first chain and the second chain extend toward a selected article while coming into mesh each other from a state in which the first chain and the second chain are at least partially separated from each other to push the selected articles. In this case, it is possible to reduce the size of the pushing device as compared with the configuration of a pushing device that pushes a selected article by bringing the rod into contact with the selected article.

Furthermore, the pushing device may include a device body that is mounted to the guide device, a pushing plate having a plate shape, and a link mechanism that connects the device body and the pushing plate and supports the pushing plate. In addition, a shape of the link mechanism may be changeable between a first state and a second state in which the link mechanism extends further than the first state toward the selected articles. It is also preferable that the pushing plate pushes the selected article by changing the shape of the link mechanism from the first state to the second state. In this case, the pushing device can transfer the selected article from the storage rack to the transfer rack stably by pushing the selected article with the pushing plate.

It is preferable that the warehouse system includes a plurality of the pushing devices. In this case, a plurality of selected articles may be transferred simultaneously from the storage rack to the transfer rack with the third moving unit. Therefore, in the warehouse system, it is possible to more efficiently perform the carrying-out operation of the selected articles. It is noted that, in this case, the number of the plurality of the pushing devices is not necessarily the same as the number of the articles to be stored on the storage rack.

It is preferable that the pushing devices are arranged in a height direction of the articles in such a manner that the pushing devices are movable relative to each other. It is also preferable that the pushing devices are arranged in parallel in the extending direction of the storage rack in such a manner that the pushing devices are movable relative to each other.

In these cases, the pushing devices are prevented from interfering with each other while moving in the extending direction of the storage rack. Therefore, the pushing devices can move smoothly to the position of the selected articles.

A second warehouse system of the present invention is a warehouse system in which a plurality of articles is carried in and stored, and from which selected articles that are to be carried out are carried out, the selected articles being the articles that are selected from among the stored articles, the second warehouse system including:

an entrance through which the articles are carried in;
an exit through which the selected articles are carried out;
a storage rack that extends from an entrance side toward an exit side and is configured to store the articles;
a transfer rack that is disposed next to the storage rack, extends from the entrance side toward the exit side in parallel to the storage rack, and on which the selected articles are to be placed;
a selection unit configured to select the selected articles from among the articles stored on the storage rack;
a first moving unit configured to move the articles in an extending direction of the storage rack on the storage rack;
a second moving unit that is configured to be operated independently from the first moving unit and to move the selected articles toward the exit side on the transfer rack; and
a third moving unit that is operated independently from the first moving unit and the second moving unit, and is switchable between a first moving state in which the third moving unit moves the articles in the extending direction of the storage rack and a second moving state in which the third moving unit transfers the selected articles from the storage rack to the transfer rack.

The second warehouse system is characterized in that the third moving unit includes a plurality of conveyer devices that are provided to the storage rack and that are each switchable between the first moving state and the second moving state, and a control device configured to switch the conveyer devices individually between the first moving state and the second moving state.

Also in the second warehouse system of the present invention, the first moving unit, the second moving unit, and the third moving unit are operated independently from one another. Therefore, with the configurations of these warehouse systems, the storing operation of the articles that are carried in through the entrance and the carrying-out operation of the selected articles may be performed simultaneously without using a plurality of stacker cranes or similar devices.

Therefore, according to the second warehouse system of the present invention, it is possible to perform the storing operation of articles and the carrying-out operation of selected articles highly efficiently and to achieve cost reduction.

In particular, in the second warehouse system, the conveyer devices of the third moving unit are disposed in the storage rack. With this configuration, it is possible to reduce the size of the warehouse system.

The storage rack has a floor face on which the conveyer devices are disposed. It is preferable that each of the conveyer devices turns about a rotational axis extending perpendicular to the floor face to switch its state between the first moving state and the second moving state. In this case, the switching between the first moving state and the second moving state may be performed in a suitable manner.

Furthermore, it is preferable that in the second moving state, the conveyer devices are sloped downward from a storage rack side to a transfer rack side. In this case, a gravity is utilized when transferring the selected articles from the storage rack to the transfer rack, so that the force for transferring the selected articles from the storage rack to the transfer rack can be reduced, and the need for a force for transferring the selected articles from the storage rack to the transfer rack is eliminated.

The first warehouse system and the second warehouse system of the present invention preferably further include a restriction unit configured to restrict the articles on the storage rack from being transferred to the transfer rack together with the selected articles. In this case, it is possible to transfer the selected articles from the storage rack to the transfer rack accurately, and to surely prevent articles that are not selected items from being carried out from the storage rack through the exit.

It is preferable that the restriction unit includes a detection device that detects a position of an article on the storage rack as positional information, and a resting device configured to rest the articles on the storage rack while providing a specified distance between the articles in the extending direction of the storage rack based on the positional information. In this case, the articles on the storage rack are restricted from being transferred to the transfer rack together with the selected articles more suitably.

Advantageous Effects of Invention

According to the first warehouse system and the second warehouse system of the present invention, it is possible to perform the storing operation of articles and the carrying-out operation of selected articles highly efficiently and to achieve cost reduction.

DESCRIPTION OF EMBODIMENTS

The following will describe first to sixth embodiments of the present invention with reference to drawings.

First Embodiment

Figure 1:
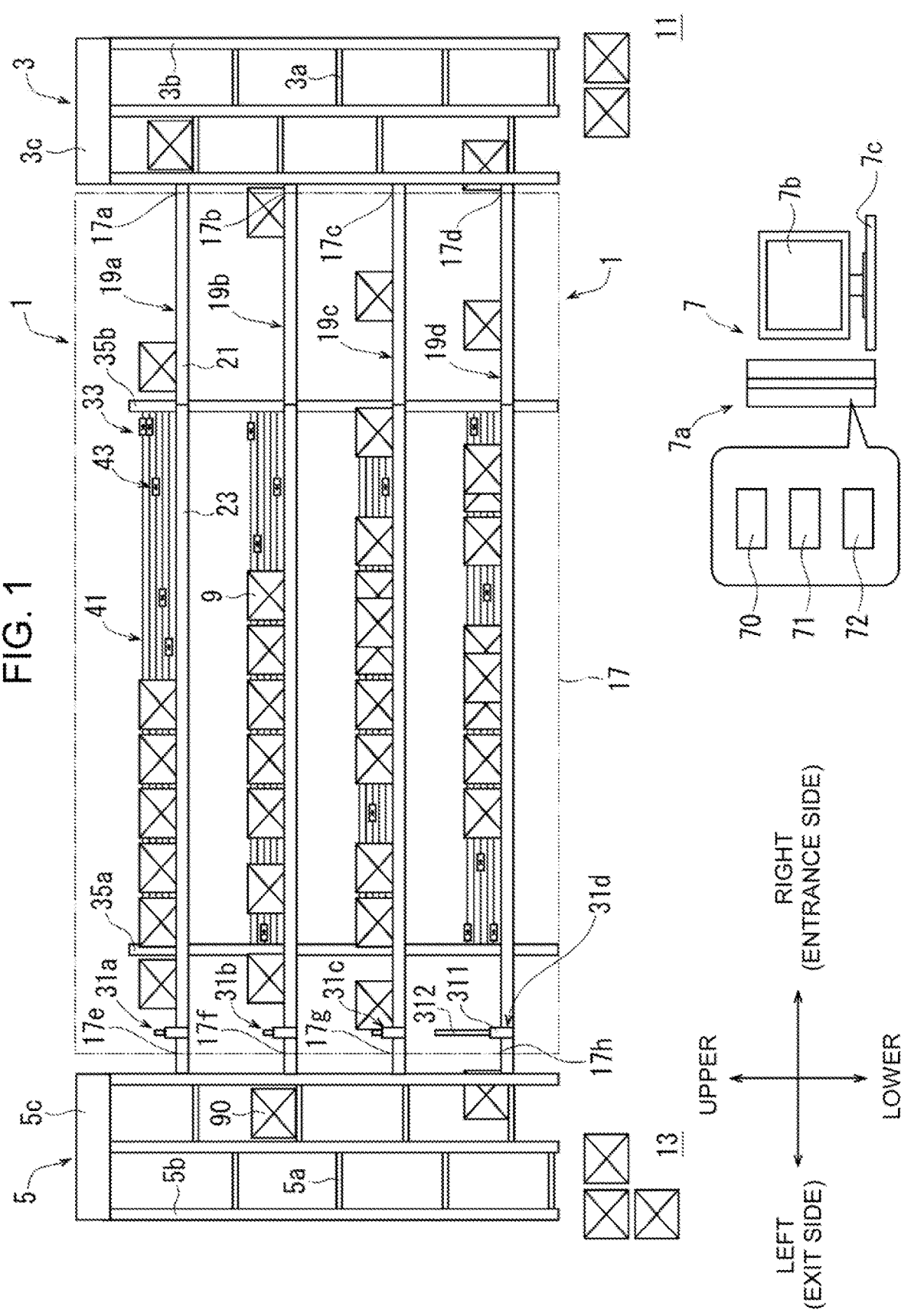
FIG. 1 is a schematic view of a warehouse system according to a first embodiment.

As illustrated in FIG. 1, a warehouse system according to a first embodiment includes a warehouse body 1, a first elevator device 3, a second elevator device 5, and a work computer 7. The warehouse system also includes a waiting area 11 where items 9 that are to be carried into the warehouse body 1 await, and a receiving area 13 where selected items 90 that are carried out from the warehouse body 1 are received. The items 9 is an example of "the articles" of the present invention, and the selected items 90 is an example of "the selected articles" of the present invention. Also, the work computer 7 is an example of "the selection unit" and "the control device" of the present invention.

Figure 2:
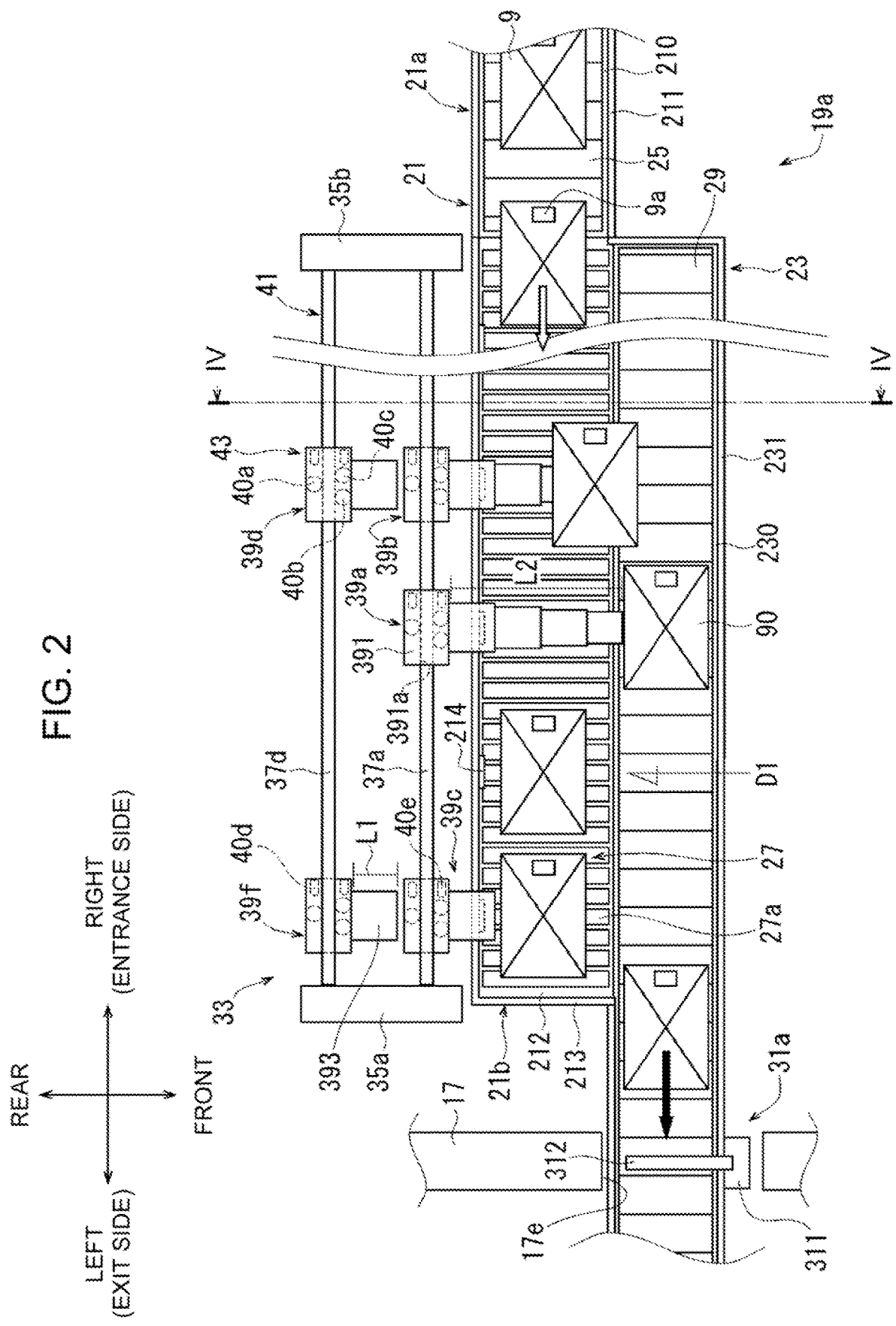
FIG. 2 is a top view illustrating a storage rack, a transfer rack, first to third moving units, and others of the warehouse system according to the first embodiment.

As illustrated in FIG. 2, an identification label 9a is attached on each of the items 9. The identification labels 9a are created using numerals, letters, and diagrams, and the like. The identification labels 9a are created so as to have different contents among the items 9 on which the identification labels 9a are attached. It is to be noted that the position at which the identification labels 9a are attached may be modified appropriately.

Figure 3:
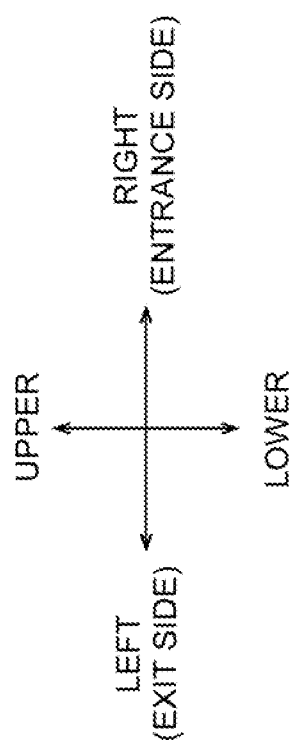
FIG. 3 is a front view of the warehouse system according to the first embodiment as viewed in a D1 direction of FIG. 2, illustrating the storage rack and others.
Figure 3:
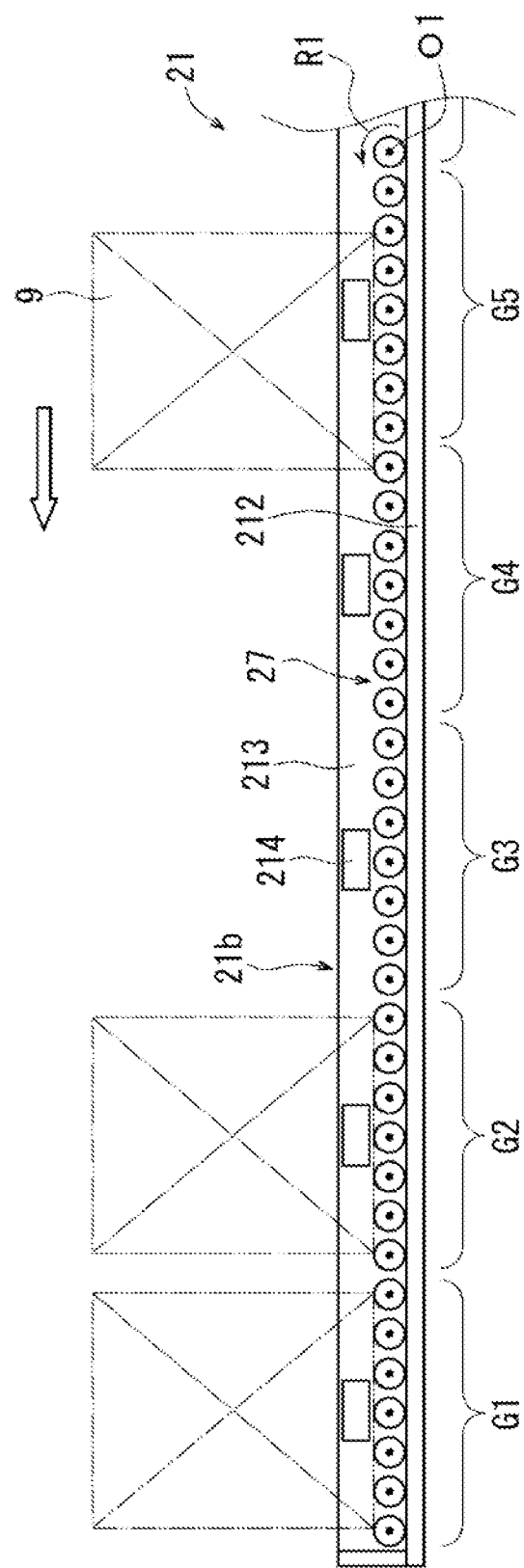

In the present embodiment, a right and left direction and an up and down direction of the warehouse body 1 are defined as indicated by arrows in FIG. 1. Also, in FIG. 2, a front and rear direction of the warehouse body 1 is defined in addition to the right and left direction of the warehouse body 1, in accordance with FIG. 1. In FIG. 3 and the subsequent figures, the right and left direction, the upper and lower direction, and the front and rear direction of the warehouse body 1 are defined in accordance with FIGS. 1 and 2. The right and left direction, the up and down direction, and the front and rear direction are perpendicular to one another.

As illustrated in FIG. 1, the warehouse body 1 includes a housing 17 formed in a rectangular shape. First to fourth entrances 17a-17d are formed on the right side of the housing 17. In addition, first to fourth exits 17e-17h are formed on the left side of the housing 17. The first to fourth entrances 17a-17d and the first to fourth exits 17e-17h are arranged in the height direction of the housing 17. The first entrance 17a corresponds to the first exit 17e. Similarly, the second to fourth entrances 17b-17d correspond to the second to fourth exits 17f-17h, respectively. The first to fourth entrances 17a-17d each are an example of "the entrance" of the present invention. The first to fourth exits 17e-17h each are an example of "the exit" of the present invention.

The housing 17 has therein first to fourth rack units 19a-19d. The first to fourth rack units 19a-19d are arranged in layers in the height direction of the housing 17. With this structure, in the housing 17, the first rack unit 19a is located on the top of the layers and the fourth rack unit 19d is located on the bottom of the layers. Also, in the housing 17, the first to fourth rack units 19a-19d are arranged horizontally in the right and left direction. It is to be noted that the number of the rack units provided in the housing 17 may be designed appropriately. It is also to be noted that the number of the entrances and the number of the exits formed in the housing 17 may be designed appropriately correspondingly to the number of the rack units.

The first rack unit 19a is connected to the first entrance 17a and the first exit 17e. The second rack unit 19b is connected to the second entrance 17b and the second exit 17f. The third rack unit 19c is connected to the third entrance 17c and the third exit 17g. The fourth rack unit 19d is connected to the fourth entrance 17d and the fourth exit 17h.

The first to fourth rack units 19a-19d have the same configuration that includes a storage rack 21 and a transfer rack 23. The following will describe configurations of the storage rack 21 and the transfer rack 23 based on the first rack unit 19a.

As illustrated in FIG. 2, the storage rack 21 extends horizontally in the right and left direction from the first entrance 17a side to the first exit 17e side. The storage rack 21 includes an introducing section 21a and a rack body 21b. The introducing section 21a is connected to the right end of the rack body 21b. The introducing section 21a extends from the rack body 21b toward the first entrance 17a side and faces the first elevator device 3 from the first entrance 17a illustrated in FIG. 1. As illustrated in FIG. 2, the introducing section 21a includes a first floor face 210 that is horizontal in the right and left direction and the front and rear direction and a first vertical wall 211. The first vertical wall 211 extends vertically upward relative to the first floor face 210 and is configured to prevent the items 9 moving along the introducing section 21a from being dropped therefrom.

The rack body 21b is formed so that the rack body 21b and the introducing section 21a have the same width in the front and rear direction. The rack body 21b is connected to the introducing section 21a and extends to the left side. The rack body 21b is configured to store the items 9 that are transferred through the introducing section 21a. The rack body 21b includes a second floor face 212 that is horizontal in the right and left direction and the front and rear direction, and a second vertical wall 213. The second floor face 212 is an example of "the floor face" of the present invention. The second vertical wall 213 extends vertically upward relative to the second floor face 212 and is configured to prevent the items 9 and the selected items 90 from being dropped from the rack body 21b.

As illustrated in FIG. 3, a plurality of detection sensors 214 is provided to the second vertical wall 213. The detection sensors 214 are arranged in the right and left direction on the second vertical wall 213 at predetermined intervals between them. In the present embodiment, the number of the detection sensors 214 is equal to the number of the items 9 that can be stored on the rack body 21b. The detection sensors 214 each are an example of "the detection device" of the present invention. The detection sensors 214 are communicably connected to the work computer 7 illustrated in FIG. 1. The detection sensors 214 detect positions of the items 9 on the rack body 21b as positional information and transmits the positional information to the work computer 7.

Also, a first belt conveyer device 25 is provided to the first floor face 210 of the introducing section 21a, a roller conveyer device 27 is provided to the second floor face 212 of the rack body 21b. The first belt conveyer device 25 and the roller conveyer device 27 form "the first moving unit" of the present invention.

The first belt conveyer device 25 is a commercially available product. The first belt conveyer device 25 is controllable by the work computer 7 illustrated in FIG. 1. As illustrated in FIG. 2, the first belt conveyer device 25 transfers the items 9 placed thereon from the first entrance 17a to the rack body 21b on the introducing section 21a.

As illustrated in FIG. 3, the roller conveyer device 27 includes a plurality of transfer rollers 27a. Each of the transfer rollers 27a has a motor (not illustrated), and is configured to rotate in R1 direction indicated in the same figure about a rotational axis O1 extending in the axial direction. The transfer rollers 27a of the roller conveyer device 27 are individually controllable by the work computer 7 illustrated in FIG. 1. It is to be noted that in FIG. 3, the items 9 are drawn with imaginary lines for the ease of explanation.

The roller conveyer device 27 is configured to transfer the items 9 that are transferred along the introducing section 21a to the left side on the rack body 21b, i.e., toward the first exit 17e side with the rotation of the transfer rollers 27a, as indicated by a white arrow in FIG. 2. The roller conveyer device 27 is also configured to rest the items 9 on the rack body 21b by stopping the rotation of the transfer rollers 27a via the work computer 7 for performing the storing operation of the items 9 on the rack body 21b, based on the positional information detected by the detection sensors 214. Accordingly, the roller conveyer device 27 functions also as "the resting device" of the present invention. In other words, the detection sensors 214, the work computer 7, and the roller conveyer device 27 form "the restriction unit" of the present invention. Details of the storage of the items 9 on the rack body 21b will be described later.

Figure 4:
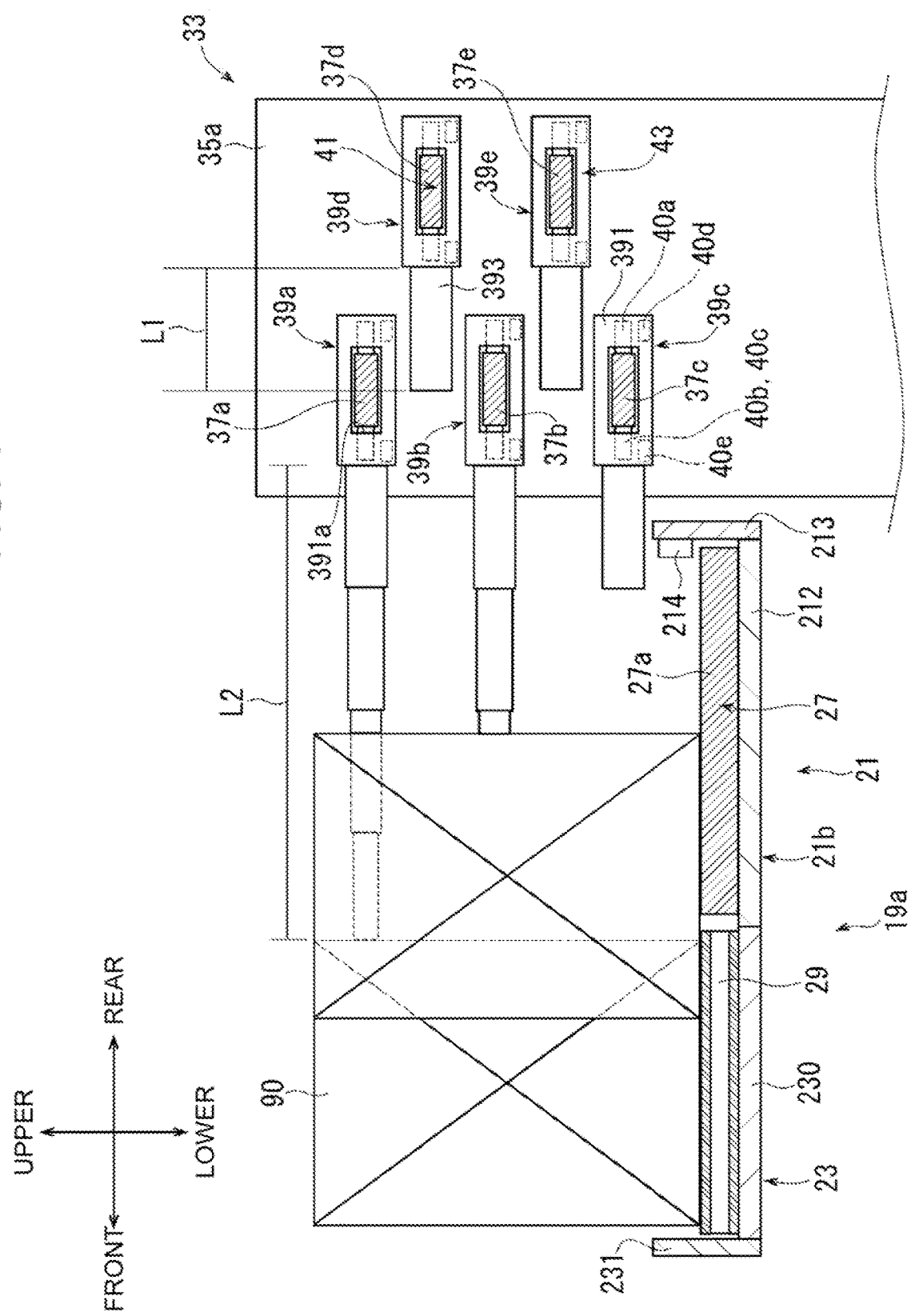
FIG. 4 is a cross-sectional view of the warehouse system according to the first embodiment taken along line IV-IV of FIG. 2.

The transfer rack 23 is disposed next to the storage rack 21 on the front side of the storage rack 21. The transfer rack 23 extends horizontally in the right and left direction from the first entrance 17a side toward the first exit 17e side and in parallel to the storage rack 21. Also, as illustrated in FIG. 4, the transfer rack 23 is parallel to the rack body 21b in the right and left direction and the front and rear direction. The transfer rack 23 includes a third floor face 230 that is horizontal in the right and left direction and the front and rear direction, and a third vertical wall 231. The third vertical wall 231 extends vertically upward relative to the third floor face 230 and is configured to prevent the selected items 90 from being dropped from the transfer rack 23. The third floor face 230 is connected to the front end of the second floor face 212. In this way, the transfer rack 23 is connected to the front end of the rack body 21b.

A second belt conveyer device 29 is provided to the third floor face 230 of the transfer rack 23. The second belt conveyer device 29 is an example of "the second moving unit" of the present invention. As is the first belt conveyer device 25 described above, the second belt conveyer device 29 is a commercially available product. The second belt conveyer device 29 is controllable by the work computer 7 illustrated in FIG. 1. As indicated by a black arrow in FIG. 2, the second belt conveyer device 29 transfers the selected items 90 placed thereon toward the first exit 17e side on the transfer rack 23. It is to be noted that roller conveyer devices may be employed as alternatives to the first and second belt conveyer devices 25, 29.

Also, as illustrated in FIG. 1, the warehouse body 1 includes first to fourth gate devices 31a-31d. The first gate device 31a is mounted to the first rack unit 19a and located near the first exit 17e in the housing 17. Similarly, the second to fourth gate devices 31b-31d are mounted to the second to fourth rack units 19b-19d and located near the second to fourth exits 17f-17h, respectively, in the housing 17.

The first to fourth gate devices 31a-31d have the same configuration that includes a device body 311 and a shield plate 312. Configurations of the device body 311 and the shield plate 312 will be described below based on the first gate device 31a.

As illustrated in FIG. 2, the device body 311 is mounted to the transfer rack 23 and located near the first exit 17e. The device body 311 has therein a drive unit (not illustrated) for oscillating the shield plate 312. The device body 311 is controllable by the work computer 7 illustrated in FIG. 1. The shield plate 312 illustrated in FIG. 2 is oscillatably mounted to the device body 311 The first gate device 31a is configured to switch between permission and prohibition of the carry-out of the selected items 90 that are transferred along the transfer rack 23 through the first exit 17e, by oscillating the shield plate 312 relative to the device body 311.

Also, as illustrated in FIG. 1, the warehouse body 1 includes a pushing mechanism 33. The pushing mechanism 33 is an example of "the third moving unit" of the present invention. The pushing mechanism 33 is mounted in the housing 17 and disposed on the rear side of the first to fourth rack units 19a-19d.

The pushing mechanism 33 comprises a first support post 35a, a second support post 35b, four guide rail groups 41, four pushing device groups 43, and the work computer 7. It is to be noted that the number of the guide rail groups 41 is determined correspondingly to the number of the rack units.

The first and second support posts 35a, 35b are fixed to a floor section of the housing 17 and extend vertically upward. As illustrated in FIG. 2, the first support post 35a and the second support post 35b are disposed so as to have an interval that is substantially equal to the length of the rack body 21b of the storage rack 21 in the right and left direction, between the first support post 35a and the second support post 35b.

As illustrated in FIG. 4, each of the guide rail groups 41 is formed by first to fifth guide rails 37a-37e. As illustrated in FIG. 1, each of the guide rail groups 41 is fixed to the first and second support posts 35a, 35b so as to extend between the first support post 35a and the second support post 35b. In this way, the guide rail groups 41 are located on the rear side of the first to fourth rack units 19a-19d.

As illustrated in FIG. 2, the guide rail groups 41, i.e., the first to fifth guide rails 37a-37e are made of metal. Therefore, the first to fifth guide rails 37a-37e have a rigidity that withstands the weight of first to fifth pushing devices 39a-39e, which will be described later, as well as the reaction force that occurs when rods 393 of the first to fifth pushing devices 39a-39e push the selected items 90. The first to fifth guide rails 37a-37e extend horizontally in the right and left direction along the storage rack 21. As illustrated in FIG. 4, of the first to fifth guide rails 37a-37e, the first to third guide rails 37a-37c are arranged in the height direction at predetermined intervals between them. The fourth and fifth guide rails 37d, 37e are disposed on the rear side of the first to third guide rails 37a-37c at a predetermined distance from the first to third guide rails 37a-37c. The fourth guide rail 37d and the fifth guide rail 37e are also arranged in the height direction at a predetermined interval. More specifically, the fourth guide rail 37d is disposed between the first guide rail 37a and the second guide rail 37b, and the fifth guide rail 37e is disposed between the second guide rail 37b and the third guide rail 37c.

As illustrated in FIGS. 2 and 4, each of the pushing device groups 43 is formed by the first to fifth pushing devices 39a-39e. The first to fifth pushing devices 39a-39e are controllable by the work computer 7 illustrated in FIG. 1. As illustrated in FIG. 4, the first to fifth pushing devices 39a-39e have the same configuration that includes a device body 391 and a rod 393. It is to be noted that the number of the pushing devices forming a pushing device group 43 may be designed appropriately. It is also to be noted that the number of the guide rails forming a guide rail group 41 is determined correspondingly to the number of the pushing devices.

Each device body 391 has an insertion hole 391a. The insertion holes 391a are each formed through the device bodies 391 in the right and left direction so as to allow insertion of the first to fifth guide rails 37a-37e. Also, each device body 391 has therein the guide roller 40a, first and second driven rollers 40b, 40c, and first and second actuator motors 40d, 40e.

The guide roller 40a and the first and second driven rollers 40b, 40c are disposed so as to face each other. The first actuator motor 40d actuates the guide roller 40a. The second actuator motor 40e actuates the rod 393. The first and second actuator motors 40d, 40e are controllable by the work computer 7 illustrated in FIG. 1. The first and second support posts 35a, 35b, the guide rail groups 41, the guide rollers 40a, the first and second driven rollers 40b, 40c, and the first actuator motor 40d form "the guide device" of the present invention. It is to be noted that the number of the guide rollers 40a and the first and second driven rollers 40b, 40c may be designed appropriately.

The rods 393 are made of metal and have a rigidity that withstands the reaction force that occurs when the rods 393 push the selected items 90. Each rod 393 is disposed on the front face of the device body 391. Each rod 393 extends frontward from the device body 391 in an axial direction of the rod 393. As illustrated in FIG. 2, each rod 393 has a first length L1 corresponding to the length when the rod 393 is most retracted, and a second length L2 corresponding to the length when the rod 393 is most extended. The rod 393 is extendable and retractable in stages between the first length L1 and the second length L2. It is to be noted that the size or the length of the rod 393 may be designed appropriately in accordance with factors, such as the size or the weight of the items 9 stored on the storage rack 21 or the size or weight of the selected items 90.

As illustrated in FIG. 4, in the first pushing device 39a, the first guide rail 37a is inserted through the insertion hole 391a of the device body 391. Meanwhile, in the device body 391, the guide roller 40a and the first and second driven rollers 40b, 40c hold the first guide rail 37a. In this way, by mounting the device body 391 to the first guide rail 37a, the first pushing device 39a is mounted to the first guide rail 37a on the rear side of the storage rack 21. The first pushing device 39a is movable horizontally in the right and left direction relative to the storage rack 21 while being guided by the first guide rail 37a, in response to the first and second driven rollers 40b, 40c being driven by the guide roller 40a that is actuated by the first actuator motor 40d. As is the case of the first pushing device 39a, the second to fifth pushing devices 39b-39e are mounted to the second to fifth guide rails 37b-37e, respectively, on the rear side of the storage rack 21. In this way, the second to fifth pushing devices 39b-39e are also movable horizontally in the right and left direction relative to the storage rack 21 while being guided by the second to fifth guide rails 37b-37e, respectively. Here, the first to fifth pushing devices 39a-39e are movable independently from one another by the control of the work computer 7.

In this way, by mounting the first to fifth pushing devices 39a-39e to the first to the first to fifth guide rails 37a-37e, respectively, the first to third pushing devices 39a-39c are arranged in the height direction of the items 9. Also, the fourth and fifth pushing devices 39d, 39e are disposed on the rear side of the first to third pushing devices 39a-39c. In other words, as illustrated in FIG. 2, the first to third pushing devices 39a-39c are arranged parallel to the fourth and fifth pushing devices 39d, 39e in the extending direction of the storage rack 21. The fourth and fifth pushing devices 39d, 39e are also arranged in the height direction of the items 9. More specifically, the fourth pushing device 39d is located on the rear side of the first to third pushing devices 39a-39c and between the first pushing device 39a and the second pushing device 39b. The fifth pushing device 39e is also located on the rear side of the first to third pushing devices 39a-39c and between the second pushing device 39b and the third pushing device 39c.

Then, a clearance is provided between the first pushing device 39a and the second pushing device 39b in the height direction, and a clearance is provided between the second pushing device 39b and the third pushing device 39c in the height direction. Therefore, when the first to third pushing devices 39a-39c are movable relative to each other horizontally in the right and left direction while passing by each other in the height direction. Also, a clearance is provided between the fourth pushing device 39d and the fifth pushing device 39e in the height direction. Thus, the fourth and fifth pushing devices 39d, 39e are also movable relative to each other horizontally in the right and left direction while passing by each other in the height direction. A clearance is provided between the first to third pushing devices 39a-39c and the fourth and fifth pushing devices 39d, 39e in the front and rear direction. Therefore, the first to third pushing devices 39a-39c and the fourth and fifth pushing devices 39d, 39e are movable relative to each other horizontally in the right and left direction while passing by each other in the front and rear direction.

The first elevator device 3 illustrated in FIG. 1 includes a plurality of mount bases 3a extending horizontally in the right and left direction, a plurality of guide rails 3b extending vertically in the up and down direction and perpendicularly to the mount bases 3a, and a device body 3c. A power device (not illustrated) for moving the mount bases 3a is mounted to the device body 3c. The first elevator device 3 is controllable by the work computer 7. With this configuration, in the first elevator device 3, the mount bases 3a are rotated around in the vertical direction along the guide rails 3b. Thus, the first elevator device 3 is configured such that the items 9 waiting at the waiting area 11 are placed one by one on each of the mount bases 3a and automatically transferred to the first to fourth entrances 17a-17d of the warehouse body 1.

The second elevator device 5 having the same configuration as the first elevator device 3 includes a plurality of mount bases 5a, a plurality of guide rails 5b, and device body 5c. The second elevator device 5 is also controllable by the work computer 7. With this configuration, in the second elevator device 5, the mount bases 5a are rotated around in the vertical direction along the guide rails 5b. Here, in the second elevator device 5, the mount bases 5a are rotated around in the vertical direction but opposite to the direction in which the mount bases 3a of the first elevator device 3 are rotated around. Thus, the second elevator device 5 is configured such that the selected items 90 that are carried out through the first to fourth exits 17e-17h are placed one by one on each of the mount bases 5a and automatically transferred to the receiving area 13.

The work computer 7 includes a computer body 7a, a display 7b, and a keyboard 7c. The work computer 7 is disposed at a location away from the warehouse body 1.

The computer body 7a has therein a ROM 70, a CPU 71, a storage medium 72, and the like. The ROM 70 stores therein programs for operating the warehouse system, such as a program for controlling the first and second belt conveyer devices 25, 29, the roller conveyer device 27, the first to fourth gate devices 31a-31d, the first to fifth pushing devices 39a-39e, and the first and second elevator devices 3, 5. The CPU 71 executes the programs and transmits control signals to each of the first and second belt conveyer devices 25, 29, the roller conveyer device 27, the first to fourth gate devices 31a-31d, the first to fifth pushing devices 39a-39e, and the first and second elevator devices 3, 5. The CPU 71 also transmits control signals to the roller conveyer device 27 based on the positional information detected by the detection sensors 214. Thus, in the warehouse system, the first and second belt conveyer devices 25, 29, the roller conveyer device 27, the first to fourth gate devices 31a-31d, the first to fifth pushing devices 39a-39e, and the first and second elevator devices 3, 5 are operable independently from each other.

The storage medium 72 stores therein identification labels 9a attached to the items 9. Thus, the storage medium 72 stores the contents of the items 9 based on the identification labels 9a. The display 7b displays thereon information of the identification labels 9a, and information of the contents of the items 9 based on the identification labels 9a. The display 7b also displays thereon positional information of the items 9 on the rack bodies 21b of the storage racks 21 based on the positional information detected by the detection sensors 214. With the keyboard 7c, an operator (not illustrated) performs various pieces of control for operating the warehouse system.

With the warehouse system, a plurality of the items 9 is carried in and stored on the warehouse body 1 and, of the stored items 9, the selected items 90 to be carried out are carried out from the warehouse body 1, which will be described below.

First, when carrying in and storing the items 9 in the warehouse body 1, the operator places the items 9 on the mount bases 3a at the waiting area 11. The items 9 placed on the mount bases 3a are moved upward by the first elevator device 3 and carried into the warehouse body 1 through one of the first to fourth entrances 17a-17d. Here, in the warehouse system, through which of the first to fourth entrances 17a-17d the items 9 are carried into the warehouse body 1 is not critical. For each of the items 9, one of the first to fourth entrances 17a-17d that is available is selected in accordance with the storage condition in the first to fourth rack units 19a-19d of the storage rack 21.

For example, as illustrated in FIG. 2, the item 9 that is carried in through the first entrance 17a is moved toward the first exit 17e side, i.e., toward the rack body 21b, on the introducing section 21a of the storage rack 21 by the first belt conveyer device 25. The item 9 moved to the rack body 21b is then moved toward the first exit 17e on the rack body 21b by the roller conveyer device 27.

Here, when no other item 9 is stored on the rack body 21b, the item 9 that is carried in through the first entrance 17a is moved by the roller conveyer device 27 to the leftmost on the rack body 21b, that is, to a position closest to the first exit 17e. Then, in the second vertical wall 213, the detection sensor 214 that is located at the leftmost detects the position of the item 9, and transmits the positional information to the work computer 7. In response to this, the work computer 7 stops the motion of the transfer rollers 27a of the roller conveyer device 27 on which the item 9 is placed. More specifically, the work computer 7 stops the motion of the transfer rollers 27a of a group G1 in FIG. 3. In this way, the item 9 is stored on the rack body 21b. Meanwhile, the work computer 7 keeps the transfer rollers 27a of the remaining groups other than the group G1 moving. Accordingly, the item 9 that is newly carried in through the first entrance 17a is moved toward the first exit 17e on the rack body 21b by the roller conveyer device 27.

Meanwhile, in the case where another item 9 is already stored on the rack body 21b, the item 9 that is carried in through the first entrance 17a is moved along the rack body 21b to a position close to the item 9 that is already stored by the roller conveyer device 27. Then, the work computer 7 controls the roller conveyer device 27 based on the positional information that is already received to thereby stop the moving of the item 9 carried in through the first entrance 17a while providing a specified distance from the item 9 already stored. In other words, the work computer 7 also causes the transfer rollers 27a of a group G2 to stop, following the transfer rollers 27a of the group G1 that are already stopped. Meanwhile, the work computer 7 keeps the transfer rollers 27a of the groups other than the groups G1 and G2 moving. Similarly, for the items 9 that are sequentially carried in through the first entrance 17a, the work computer 7 also causes the transfer rollers 27a of the groups G3 to G5 to stop sequentially to stop the moving of the items 9 along the rack body 21b. In this way, on the rack body 21b, the items 9 are sequentially stored at predetermined intervals between them in the right and left direction.

Subsequently, when carrying out the selected items 90 from the warehouse body 1, the operator selects the item 9 to be carried out from among the items 9 stored on the warehouse body 1, based on the identification labels 9a and the information of the respective items 9 stored on the warehouse body 1 displayed on the display 7b illustrated in FIG. 1. The item 9 thus selected turns into the selected item 90.

In response to the selection of the selected item 90, the work computer 7 selects one from the first to fifth pushing devices 39a-39e to be operated, among the pushing device groups 43. Here, for example, when the selected item 90 is present in the first rack unit 19a, the work computer 7 selects operative one from the first to fifth pushing devices 39a-39e of the pushing device group 43 that corresponds to the first rack unit 19a. Similarly, when the selected item 90 is present in one of the second to fourth rack units 19b-19d, the work computer 7 selects operative one from the first to fifth pushing devices 39a-39e of the pushing device group 43 that corresponds to the one of the second to fourth rack units 19b-19d. It is to be noted that the selection of the first to fifth pushing devices 39a-39e is performed based on the operating condition of the first to fifth pushing devices 39a-39e, the distance from the selected item 90, etc.

In this way, for example, when the first pushing device 39a is selected, as illustrated in FIG. 2, the first pushing device 39a is moved to the rear side of the selected item 90 while being guided by the first guide rail 37a. Then, the first pushing device 39a is actuated by the second actuator motor 40e, so that the rod 393 is extended from the first length L1 and brought into contact with the selected item 90. In this state, the second actuator motor 40e causes the rod 393 to extend to the second length L2 to thereby push the selected item 90 toward the transfer rack 23. Thus, the selected item 90 is transferred from the rack body 21b to the transfer rack 23 by the first pushing device 39a. As described earlier, the items 9 are stored at predetermined intervals between them in the right and left direction. Therefore, during the transfer of the selected item 90 from the rack body 21b to the transfer rack 23, the item 9 present next to the selected item 90 is prevented from being transferred to the transfer rack 23 together with the selected item 90.

Then, after the selected item 90 is transferred to the transfer rack 23, the second actuator motor 40e causes the rod 393 to retract to the first length L1. Also, in response to the transfer of the selected item 90 to the transfer rack 23, the work computer 7 resumes the motion of the transfer rollers 27a that have been stopped. Thus, the items 9 on the rack body 21b are moved so that the vacant space where the selected item 90 was present is filled.

In the warehouse system, each pushing device group 43 is formed by the first to fifth pushing devices 39a-39e. Therefore, in each of the first to fourth rack units 19a-19d, it is possible to transfer up to five selected items 90 simultaneously to the transfer rack 23. In addition, in accordance with the size or the weight of the selected item 90, for example, it is possible to transfer the selected item 90 to the transfer rack 23 with the first, second, and fourth pushing devices 39a, 39b, 39d, or it is also possible to transfer the selected item 90 to the transfer rack 23 with the second, third, and fifth pushing devices 39b, 39c, 39e. Here, as illustrated in FIG. 4, the fourth pushing device 39d is located on the rear side of the first and second pushing devices 39a, 39b and between the first pushing device 39a and the second pushing device 39b. This configuration allows the fourth pushing device 39d to extend the rod 393 through the space between the first pushing device 39a and the second pushing device 39b to push the selected item 90. Similarly, this configuration allows the fifth pushing device 39e to extend the rod 393 through the space between the second pushing device 39b and the third pushing device 39c to push the selected item 90. In this way, in the warehouse system, the first to third pushing devices 39a-39c do not hinder the fourth and fifth pushing devices 39d, 39e from pushing the selected item 90.

Then, the selected item 90 that is transferred to the transfer rack 23 is moved toward one of the first to fourth exits 17e-17h illustrated in FIG. 1 by the second belt conveyer device 29. The selected item 90 that is carried out through the one of the first to fourth exits 17e-17h is placed on the mount base 5a. At this time, the timing for placing the selected item 90 to be carried out through the one of the first to fourth exits 17e-17h on the mount base 5a is adjusted by the corresponding one of the first to fourth gate devices 31a-31d. Then, the selected item 90 is descended by the second elevator device 5 and moved from the warehouse body 1 to the receiving area 13. In this way, the carrying-out operation of the selected item 90 is completed, and the operator can perform works such as further transportation of the selected item 90 to the destination.

In the warehouse system, the first and second belt conveyor devices 25, 29, the roller conveyer device 27, and the first to fifth pushing devices 39a-39e are operated independently from each other while being controlled by the work computer 7. Therefore, it is possible to perform the moving of the items 9 by the first belt conveyor device 25 and the roller conveyer device 27 along the storage rack 21, the moving of the selected items 90 by the second belt conveyor device 29 along the transfer rack 23, and the transfer of the selected items 90 by the first to fifth pushing devices 39a-39e from the rack body 21b to the transfer rack 23 independently from each other. With the configuration of the warehouse system, the storing operation of the items 9 that are carried in through the first to fourth entrances 17a-17d and the carrying-out operation of the selected items 90 may be performed simultaneously without using the plurality of the stacker cranes or the like.

In addition, in the warehouse system, in the pushing mechanism 33, the first to fifth pushing devices 39a-39e forming the pushing device groups 43 are controlled by the work computer 7. The first to fifth guide rails 37a-37e forming the guide rail groups 41 guide the first to fifth pushing devices 39a-39e in the extending direction of the storage rack 21, so that the first to fifth pushing devices 39a-39e can move in the extending direction of the storage rack 21 to the position of the selected items 90. Therefore, the pushing mechanism 33 need not have the pushing devices of the number same as the number of the items 9 to be stored on the rack body 21b.

Therefore, according to the first warehouse system of the present invention, it is possible to perform the storing operation of the items 9 and the carrying-out operation of the selected items 90 highly efficiently and to achieve cost reduction.

In particular, in the warehouse system, the first to fifth pushing devices 39a-39e each include the device body 391 and the rod 393. The first to fifth pushing devices 39a-39e each extend the rod 393 to thereby push the selected item 90. Accordingly, in the warehouse system, the configuration of the first to fifth pushing devices 39a-39e can be simplified. In this regard also, the cost reduction is achieved.

Here, the rods 393 are made of metal and have a rigidity. Therefore, the rods 393 hardly bend by a reaction force that acts when the rods 393 push the selected items 90. Similarly, the guide rails 37a-37e hardly bend by the reaction force that occurs when the rods 393 push the selected items 90. For the reasons above, it is possible to push the selected items 90 in a suitable manner by the first to fifth pushing devices 39a-39e and to transfer the selected items 90 from the rack body 21b to the transfer rack 23 in a suitable manner.

Furthermore, of the first to fifth pushing devices 39a-39e, the first to third pushing devices 39a-39c are arranged in the height direction of the items 9, and the first to third pushing devices 39a-39c are arranged parallel to the fourth and fifth pushing devices 39d, 39e in the extending direction of the storage rack 21. The fourth and fifth pushing devices 39d, 39e are also arranged in the height direction of the items 9. A clearance is provided between each adjacent two of the first to fifth pushing devices 39a-39e. Thus, it is possible to avoid interferences among the first to fifth pushing devices 39a-39e when the first to fifth pushing devices 39a-39e move in the extending direction of the storage rack 21. Accordingly, the first to fifth pushing devices 39a-39e can move to the position of the selected item 90.

Also, in the warehouse system, the work computer 7 causes the transfer rollers 27a of the roller conveyer device 27 to stop individually based on the positional information from the detection sensors 214. Accordingly, on the rack body 21b, it is possible to store the items 9 in a preferable manner at predetermined intervals between them in the right and left direction. Accordingly, in the warehouse system, it is possible to transfer the selected items 90 from the rack body 21b to the transfer rack 23 accurately and also possible to surely prevent the items 9 that are not selected items 90 from being carried out through the first to fourth exits 17e-17h via the transfer rack 23.

Second Embodiment

Figure 5:
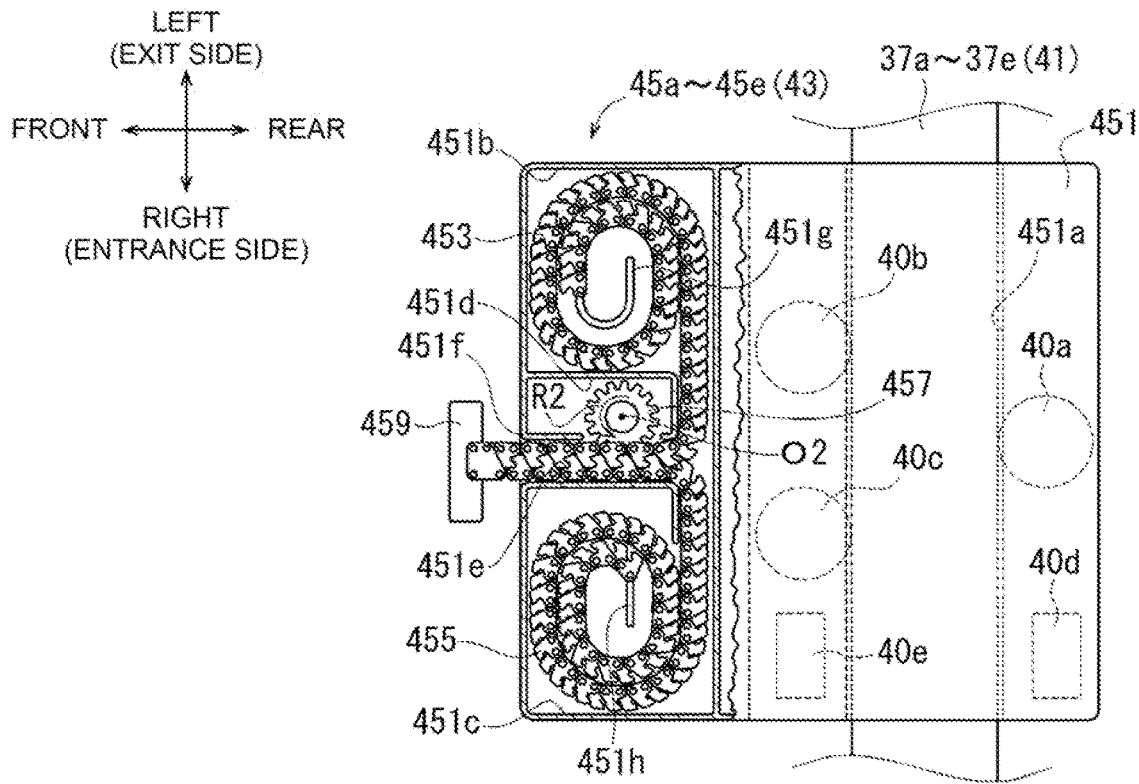
FIG. 5 is a fragmentary cross-sectional view of a warehouse system according to a second embodiment, illustrating a pushing device.
Figure 6:
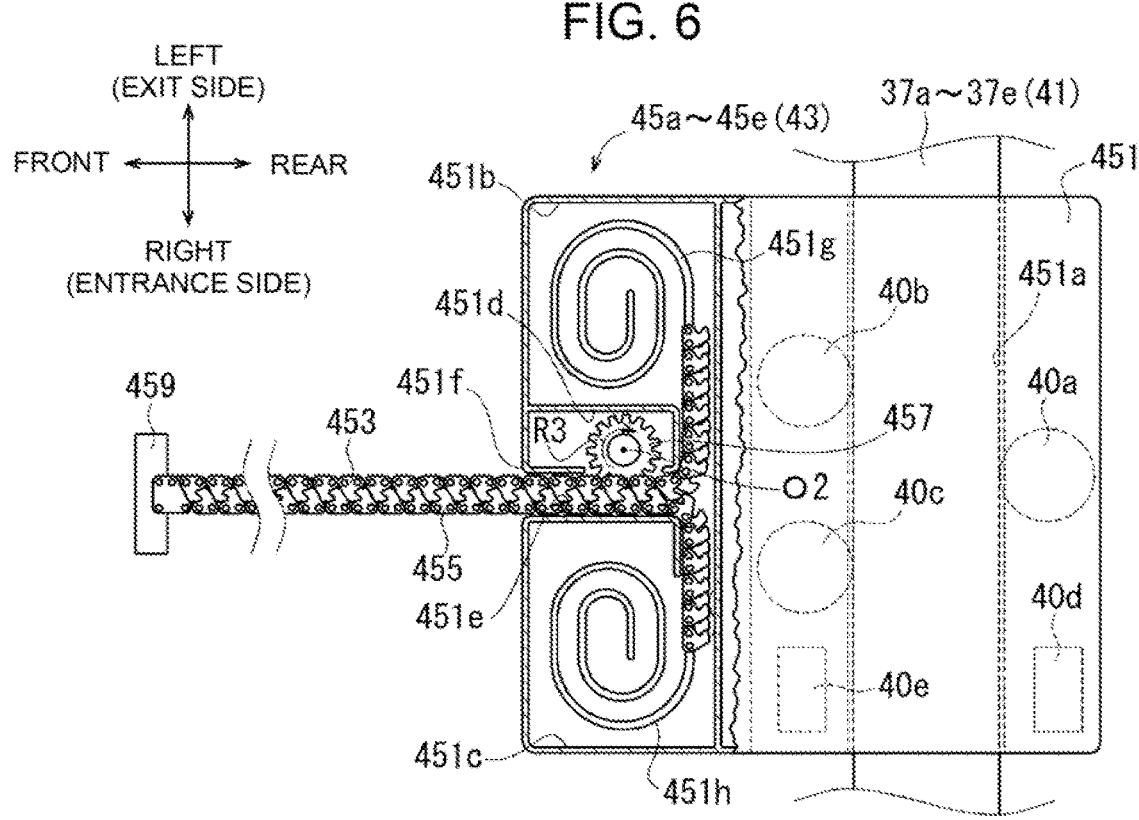
FIG. 6 is a fragmentary cross-sectional view of the warehouse system according to the second embodiment, illustrating the pushing device.

In a warehouse system according to a second embodiment, pushing device groups 43 are each formed by first to fifth pushing devices 45a-45e illustrated in FIGS. 5 and 6. The first to fifth pushing devices 45a-45e each include a device body 451, a first chain 453, a second chain 455, and a guide gear 457.

Each device body 451 has an insertion hole 451a. The insertion holes 451a are each formed through the device body 451 in the right and left direction so as to allow insertion of the first to fifth guide rails 37a-37e. Also, as is the case of the device body 391 of the warehouse system according to the first embodiment, the device body 451 has therein a guide roller 40a, first and second driven rollers 40b, 40c, and first and second actuator motors 40d, 40e. In the device body 451, the second actuator motor 40e actuates the guide gear 457.

In the device body 451, first to third accommodation chambers 451b-451d are defined on the frontward side of the insertion hole 451a, and a guide passage 451e and an opening 451f are formed on the frontward side of the insertion hole 451a. In the device body 451, the first accommodation chamber 451b is disposed on the front left side. In the first accommodation chamber 451b, a first guide groove 451g having a spiral shape is formed. In the device body 451, the second accommodation chamber 451c is disposed on the front right side. In the second accommodation chamber 451c, a second guide groove 451h having a spiral shape is formed. The third accommodation chamber 451d is disposed adjacently on the right side of the first accommodation chamber 451b. The guide passage 451e is formed between the second accommodation chamber 451c and the third accommodation chamber 451d while extending in the front and rear direction. The opening 451f is formed in the front face of the device body 451 and in communication with the guide passage 451e.

The first and second chains 453, 455 are made of metal and disposed in the device body 451. More specifically, the first chain 453 extends through the guide passage 451e and the first accommodation chamber 451b with a part of its front end protruded from the opening 451f to the outside of the device body 451. The first chain 453 is guided by the first guide groove 451g to be thereby accommodated spirally in the first accommodation chamber 451b. The second chain 455 extends through the guide passage 451e and the second accommodation chamber 451c with a part of its front end protruded from the opening 451f to the outside of the device body 451. The second chain 455 is guided by the second guide groove 451h to be thereby accommodated spirally in the second accommodation chamber 451c. The first and second chains 453, 455 are adapted to be integrated by meshing with each other in the guide passage 451e. A pusher portion 459 is mounted to the front ends of the first and second chains 453, 455. The pusher portion 459 is configured to push the selected item 90 by being brought into contact with the selected item 90. It is to be noted that the size or the length of the first and second chains 453, 455 may be designed appropriately in accordance with factors such as the size or the weight of the selected items 90.

The guide gear 457 is disposed in the third accommodation chamber 451d while protruding a part thereof into the guide passage 451e. The guide gear 457 is configured to rotate about a rotational axis O2 extending in the axial direction in R2 direction indicated in FIG. 5 or in R3 direction indicated in FIG. 6 by being actuated by the second actuator motor 40e. The guide gear 457 is in mesh with the first chain 453 in the guide passage 451e.

Although not illustrated in detail, as is the case of the first to fifth pushing devices 39a-39e of the warehouse system according to the first embodiment, the first to fifth pushing devices 45a-45e are mounted to the first to fifth guide rails 37a-37e, respectively. Accordingly, the first to third pushing devices 45a-45c are arranged in the height direction of the items 9. Also, the first to third pushing devices 45a-45c are arranged parallel to the fourth and fifth pushing devices 45d, 45e in the extending direction of the storage rack 21. In addition, the fourth and fifth pushing devices 45d, 45e are arranged in the height direction of the items 9. Because other configurations of the warehouse system are similar to those of the warehouse system according to the first embodiment, the same configurations are denoted by the same reference numerals and detailed description thereof will be omitted.

In the warehouse system, when transferring the selected item 90 from the rack body 21b to the transfer rack 23, the work computer 7 selects operative one from the first to fifth pushing devices 45a-45e, among the pushing device groups 43. Here, for example, when the first pushing device 45a is selected, the first pushing device 45a is moved to the rear side of the selected item 90 while being guided by the first guide rail 37a. Then, in the first pushing device 45a, the second actuator motor 40e rotates the guide gear 457 in R3 direction indicated in FIG. 6. Accordingly, the first and second chains 453, 455 are fed frontward from the device body 451 through the opening 451f while coming into mesh with each other in the guide passage 451e. In other words, the first and second chains 453, 455 that are in a state in which large parts of the first and second chains 453, 455 are separated from each other as illustrated in FIG. 5, are fed frontward of the device body 451 through the opening 451f while increasing the integrated parts of the first and second chains 453, 455 by being meshed with each other as illustrated in FIG. 6. In this way, by the extension of the first and second chains 453, 455 toward the selected item 90, the pusher portion 459 is brought into contact with the selected item 90. With this operation, the first and second chains 453, 455 push the selected item 90 through the pusher portion 459. Thus, in the warehouse system also, it is possible to transfer the selected item 90 from the rack body 21b to the transfer rack 23.

Meanwhile, after the selected item 90 is transferred to the transfer rack 23, the second actuator motor 40e rotates the guide gear 457 in R2 direction indicated in FIG. 5. With this, the first and second chains 453, 455 are drawn into the device body 451. Then, the first and second chains 453, 455 are disengaged from each other and accommodated in the first and second accommodation chambers 451b, 451c, respectively.

In this way, in the warehouse system, while the first to fifth pushing devices 45a-45e are not transferring the selected item 90 from the rack body 21b to the transfer rack 23, large parts of the first and second chains 453, 455 are separated from each other and accommodated in the first and second accommodation chambers 451b, 451c. Accordingly, the length of the respective first and second chains 453, 455 protruding from the device body 451 reduces. Therefore, in the warehouse system, it is possible to reduce the dimensions of the first to fifth pushing devices 45a-45e in the front and rear direction, as compared with the first to fifth pushing devices 39a-39e of the warehouse system according to the first embodiment. In the warehouse system, it is possible to reduce the dimension of the pushing mechanism 33 in the front and rear direction, as compared with the warehouse system according to the first embodiment. Other effects of the warehouse system are similar to those of the warehouse system according to the first embodiment.

Third Embodiment

Figure 7:
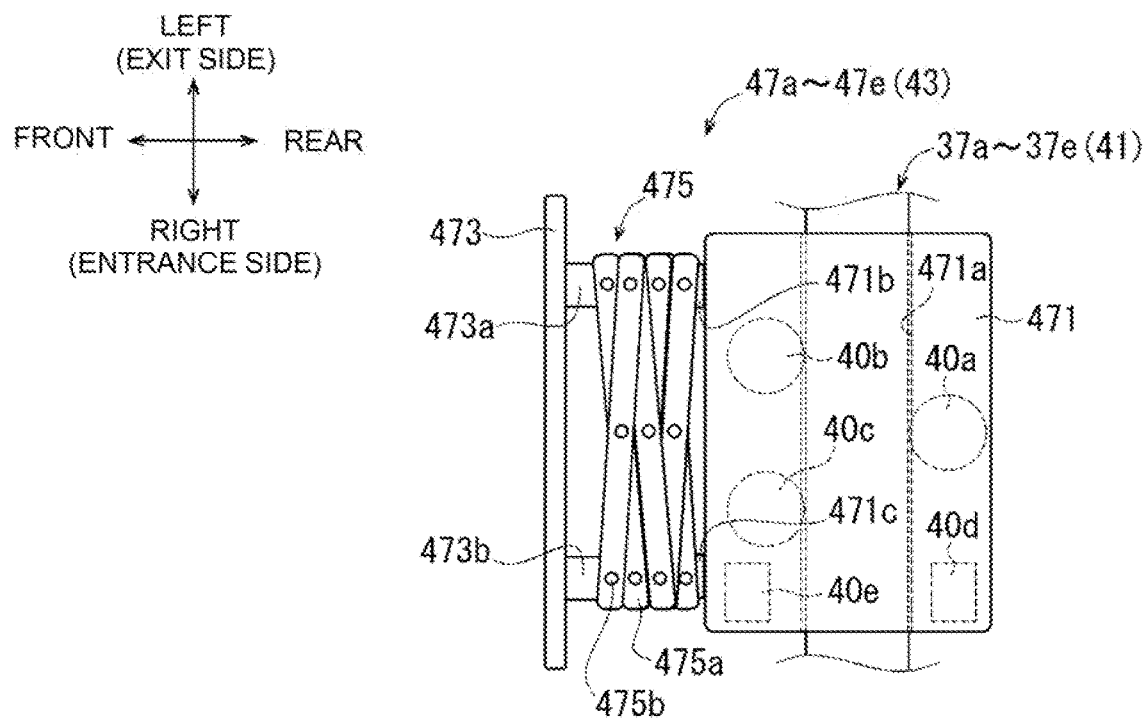
FIG. 7 is a top view of a warehouse system according to a third embodiment, illustrating a pushing device.
Figure 8:
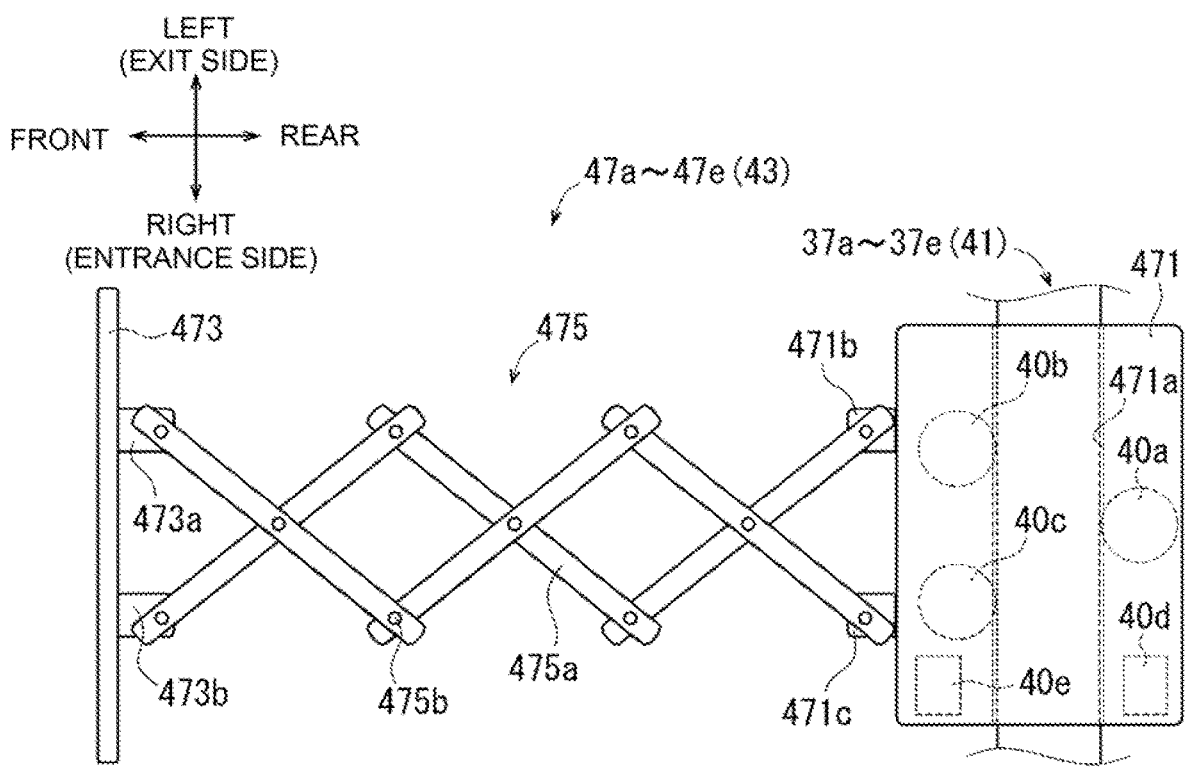
FIG. 8 is a top view of the warehouse system according to the third embodiment, illustrating a pushing device.

In a warehouse system according to a third embodiment, pushing device groups 43 are each formed by first to fifth pushing devices 47a-47e illustrated in FIGS. 7 and 8. The first to fifth pushing devices 47a-47e each include a device body 471, a pushing plate 473, and a link mechanism 475.

Each device body 471 has an insertion hole 471a. The insertion holes 471a are each formed through the device body 471 in the right and left direction so as to allow insertion of the first to fifth guide rails 37a-37e. Also, a first attachment portion 471b and a second attachment portion 471c are provided on a front face of the device body 471. The first attachment portion 471b and the second attachment portion 471c are each movable in the right and left direction on the front face of the device body 471. Also, as is the case of the device body 391 of the warehouse system according to the first embodiment, the device body 471 has therein a guide roller 40a, first and second driven rollers 40b, 40c, and first and second actuator motors 40d, 40e. In the device body 471, the second actuator motor 40e actuates the first and second attachment portions 471b, 471c.

The pushing plate 473 is formed in a rectangular plate shape. The dimension of the pushing plate 473 in the right and left direction is greater than the dimension of the device body 471 in the right and left direction. It is to be noted that the shape of the pushing plate 473 may be designed appropriately as long as the shape is greater than that of the front end of the rod 393 of the warehouse system according to the first embodiment or that of the pusher portion 459 of the warehouse system according to the second embodiment.

A third attachment portion 473a and a fourth attachment portion 473b are provided on a rear face of the pushing plate 473. The third attachment portion 473a and the fourth attachment portion 473b are movable in the right and left direction on a rear face of the pushing plate 473 in accordance with the movement of the first and second attachment portions 471b, 471c.

The link mechanism 475 comprises a plurality of link arms 475a and a plurality of connecting pins 475b. The link arms 475a are made of metal and connected to each other by the connecting pins 475b so as to be turnable relative to each other. Of the link arms 475a, the link arms 475a located at the rear end of the link mechanism 475 are connected to the first attachment portion 471b and the second attachment portion 471c by the connecting pins 475b so as to be turnable. Of the link arms 475a, the link arms 475a located at the front end of the link mechanism 475 are connected to the third attachment portion 473a and the fourth attachment portion 473b by the connecting pins 475b so as to be turnable. Thus, the link mechanism 475 is configured to support the pushing plate 473 from behind while connecting the device body 471 and the pushing plate 473. It is to be noted that the number of the link arms 475a as well as the size or the length of the link arms 475a may be designed appropriately in accordance with factors such as the size or the weight of the selected items 90.

The first attachment portion 471b and the second attachment portion 471c are movable in the right and left direction, so that the shape of the link mechanism 475 is changeable between a first state illustrated in FIG. 7 and a second state illustrated in FIG. 8. In other words, the shape of the link mechanism 475 shifts from the first state to the second state while the first attachment portion 471b and the second attachment portion 471c are brought close to each other in the right and left direction, and the shape of the link mechanism 475 shifts from the second state to the first state while the first attachment portion 471b and the second attachment portion 471c are separated from each other in the right and left direction. When the link mechanism 475 is in the first state illustrated in FIG. 7, the pushing plate 473 is brought closest to the device body 471. When the link mechanism 475 is in the second state illustrated in FIG. 8, the pushing plate 473 is moved to the frontmost position from the device body 471.

Although not illustrated in detail, as is the case of the first to fifth pushing devices 39a-39e according to the first embodiment, the first to fifth pushing devices 47a-47e are mounted to the first to fifth guide rails 37a-37e, respectively. Accordingly, the first to third pushing devices 47a-47c are arranged in the height direction of the items 9. Also, the first to third pushing devices 47a-47c are arranged parallel to the fourth and fifth pushing devices 47d, 47e in the extending direction of the storage rack 21. In addition, the fourth and fifth pushing devices 47d, 47e are arranged in the height direction of the items 9. Other configurations of the warehouse system are similar to those of the warehouse system according to the first embodiment.

In the warehouse system, when transferring the selected item 90 from the rack body 21b to the transfer rack 23, the work computer 7 selects operative one from the first to fifth pushing devices 47a-, among the pushing device groups 43. Here, for example, when the first pushing device 47a is selected, the first pushing device 47a is moved to the rear side of the selected item 90 while being guided by the first guide rail 37a. In the first pushing device 47a, the second actuator motor 40e moves the first and second attachment portions 471b, 471c so that the first and second attachment portions 471b, 471c are brought close to each other in the right and left direction. Accordingly, the link mechanism 475 moves the pushing plate 473 frontward while changing its shape from the first state to the second state. With this configuration, the pushing plate 473 is brought into contact with the selected item 90 to push the selected item 90. At this time, the link mechanism 475 supports the pushing plate 473 from behind. Thus, in the warehouse system also, it is possible to transfer the selected item 90 from the rack body 21b to the transfer rack 23.

Meanwhile, after the selected item 90 is transferred to the transfer rack 23, the second actuator motor 40e moves the first and second attachment portions 471b, 471c so that the first and second attachment portions 471b, 471c are separated away from each other in the right and left direction. Accordingly, the shape of the link mechanism 475 is shifted from the first state to the second state.

In this way, in the warehouse system, the first to third pushing devices 47a-47c push the selected item 90 with the pushing plate 473. The dimension of the pushing plate 473 in the right and left direction is greater than the dimension of the device body 471 in the right and left direction, and the pushing plate 473 is supported by the link mechanism 475. Thus, the first to third pushing devices 47a-47c can transfer the selected item 90 from the rack body 21b to the transfer rack 23 in a stable manner. Other configurations of the warehouse system are similar to those of the warehouse system according to the first embodiment.

Fourth Embodiment

Figure 9:
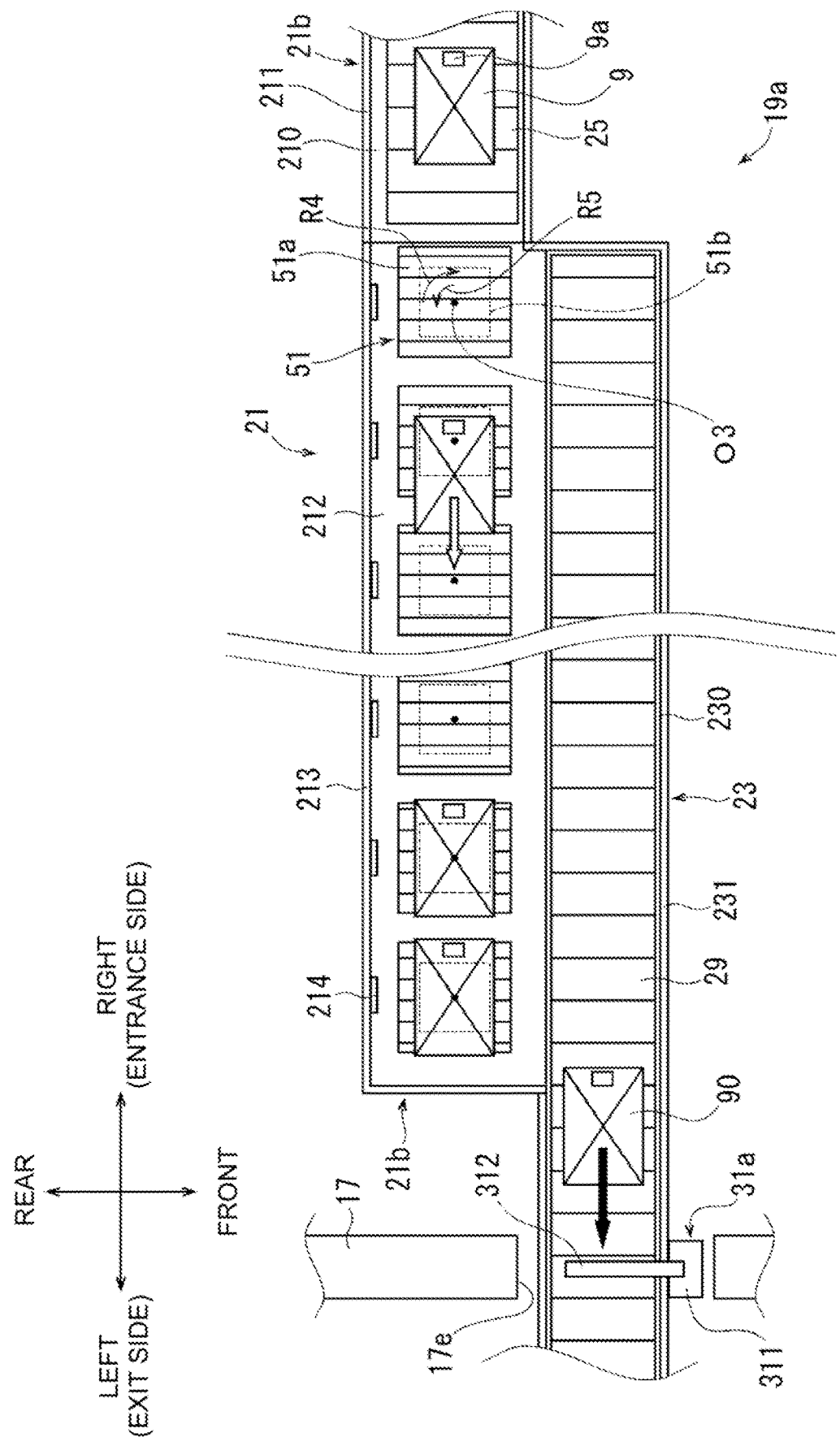
FIG. 9 is a top view illustrating a storage rack, a transfer rack, first to third moving units, and others of a warehouse system according to a fourth embodiment.

As illustrated in FIG. 9, in a warehouse system according to a fourth embodiment, a plurality of third belt conveyer devices 51 are provided on a second floor face 212 of a rack body 21b as alternatives to the roller conveyer device 27. The number of the third belt conveyor devices 51 is the same as the number of the items 9 that can be stored on the rack body 21b. The warehouse system includes no pushing mechanism 33. Also, in the warehouse system, the first belt conveyer device 25 solely forms the "the first moving unit".

The third belt conveyer devices 51 are an example of "the conveyer device" of the present invention. The third belt conveyor devices 51 are controllable individually by the work computer 7 illustrated in FIG. 1. That is, in the warehouse system, the third belt conveyor devices 51 and the work computer 7 form "the first moving unit" of the present invention. The third belt conveyor devices 51 function also as "the resting device" of the present invention.

As illustrated in FIG. 9, on the second floor face 212, the third belt conveyer devices 51 are arranged in a line from the first entrance 17a side to the first exit 17e side at predetermined intervals therebetween. Here, the distance between adjacent two of the third belt conveyer devices 51 is set to be smaller than a single item 9 or a single selected item 90. Therefore, the items 9 and the selected items 90 do not fall through the space between adjacent two of the third belt conveyor devices 51.

Each of the third belt conveyer devices 51 includes a conveyer body 51a and a turning mechanism 51b. The turning mechanism 51b is disposed in the conveyer body 51a. The turning mechanism 51b is configured to turn the conveyer body 51a in R4 or R5 direction about a turning axis O3 extending in the up and down direction perpendicularly to the second floor face 212. Here, when turning the conveyer body 51a in R4 or R5 direction, the turning mechanism 51b turns the conveyer body 51a parallel to the second floor face 212. Accordingly, the conveyer body 51a being turned in R4 or R5 direction does not contact the second floor face 212.

Figure 10:
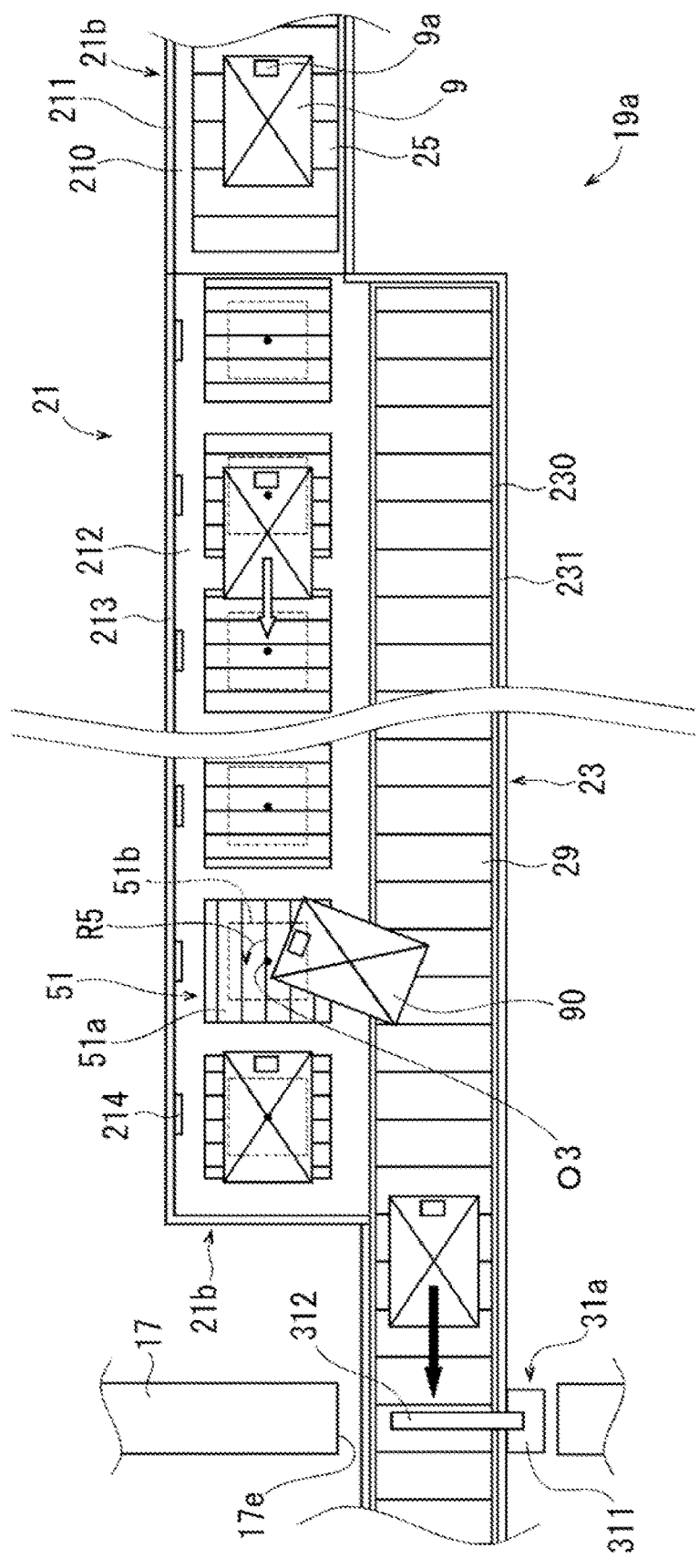
FIG. 10 is a top view of the warehouse system according to the fourth embodiment, illustrating a state in which a selected article is transferred from the storage rack to the transfer rack.

In each of the third belt conveyer devices 51, when the conveyer body 51a is turned in R4 direction, the third belt conveyor device 51 is switched to a first moving state. Meanwhile, in each of the third belt conveyer devices 51, when the conveyer body 51a is turned in R5 direction, the third belt conveyor device 51 is switched to a second moving state. When the third belt conveyer devices 51 are in the first moving state, the items 9 moved along the introducing section 21a are moved toward the first exit 17e along the rack body 21b. When the third belt conveyor devices 51 are in the second moving state, the selected items 90 are transferred from the rack body 21b to the transfer rack, as illustrated in FIG. 10. It is to be noted that FIG. 9 illustrates a state in which the conveyer bodies 51a of all of the third belt conveyor devices 51 are turned in R4 direction, that is, all of the third belt conveyor devices 51 have been switched to the first moving state. Other configurations of the warehouse system are similar to those of the warehouse system according to the first embodiment.

In the warehouse system also, when the storing operation of the items 9 is performed, for example, as illustrated in FIG. 9, the items 9 that are carried in through the first entrance 17a are moved toward the rack body 21b along the introducing section 21a of the storage rack 21 by the first belt conveyer device 25. Here, the conveyer bodies 51a of the third belt conveyor devices 51 in the first rack unit 19a are turned in R4 direction by the work computer 7. Accordingly, the items 9 that are delivered to the rack body 21b by the first belt conveyer device 25 are then moved toward the first exit 17e on the rack body 21b by the third belt conveyor devices 51. Then, the work computer 7 causes the third belt conveyor devices 51 to stop individually based on the positional information from the detection sensors 214. In this way, in the warehouse system also, on the rack body 21b, the items 9 are sequentially stored at predetermined intervals between them in the right and left direction, as is the case of the warehouse system according to the first embodiment. Also, in the warehouse system, one item 9 is to be placed on each of the third belt conveyor devices 51.

Next, when the carrying-out operation of the selected items 90 is performed, the operator operates the work computer 7 to turn only the conveyer body 51a of the third belt conveyor device 51 on which the selected item 90 is placed in R5 direction, and also to actuate the conveyer body 51a, as illustrated in FIG. 10. In response to this, the third belt conveyor device 51 on which the selected item 90 is placed is switched to the second moving state and transfers the selected item 90 from the rack body 21b to the transfer rack 23. Here, when transferring the selected item 90 to the transfer rack 23, the position of the selected item 90 is changed by being in contact with a third vertical wall 231, in addition to the second belt conveyer device 29 moving. In this way, the selected items 90 are carried out through the first to fourth exits 17e-17h and finally delivered to the receiving area 13, as is the case of the warehouse system according to the first embodiment. After the selected item 90 is moved to the transfer rack 23, the work computer 7 causes the conveyer body 51a to turn in R4 direction.

As described above, in the warehouse system also, the first and second belt conveyor devices 25, 29 and the third belt conveyor devices 51 are operated independently from each other while being controlled by the work computer 7. With the configuration of the warehouse system, the storing operation of the items 9 that are carried in through the first to fourth entrances 17a-17d and the carrying-out operation of the selected items 90 may be performed simultaneously.

In the warehouse system, because the selected items 90 are transferred from the rack body 21b to the transfer rack 23 by the third belt conveyor devices 51, the pushing mechanism 33 is unnecessary. Therefore, in the warehouse system, it is possible to further reduce the cost. In addition, in the warehouse system, no space for disposing the pushing mechanism 33 is required in the warehouse body 1. Furthermore, since the third belt conveyor devices 51 are disposed in the rack body 21b, no space dedicated for the third belt conveyor devices 51 is necessary as well. Therefore, with this configuration, it is possible to reduce the size of the warehouse system.

In the warehouse system, the third belt conveyor devices 51 of the same number as the number of the items 9 that can be stored on the rack body 21b are provided to the rack body 21b. Thus, in the warehouse system also, it is possible to simultaneously transfer a plurality of selected items 90 from the rack body 21b to the transfer rack 23. In the warehouse system, it is also possible to transfer all of the items 9 stored on the rack body 21b at a time to the transfer rack 23 as the selected items 90. Other effects of the warehouse system are similar to those of the warehouse system according to the first embodiment.

Fifth Embodiment

Figure 11:
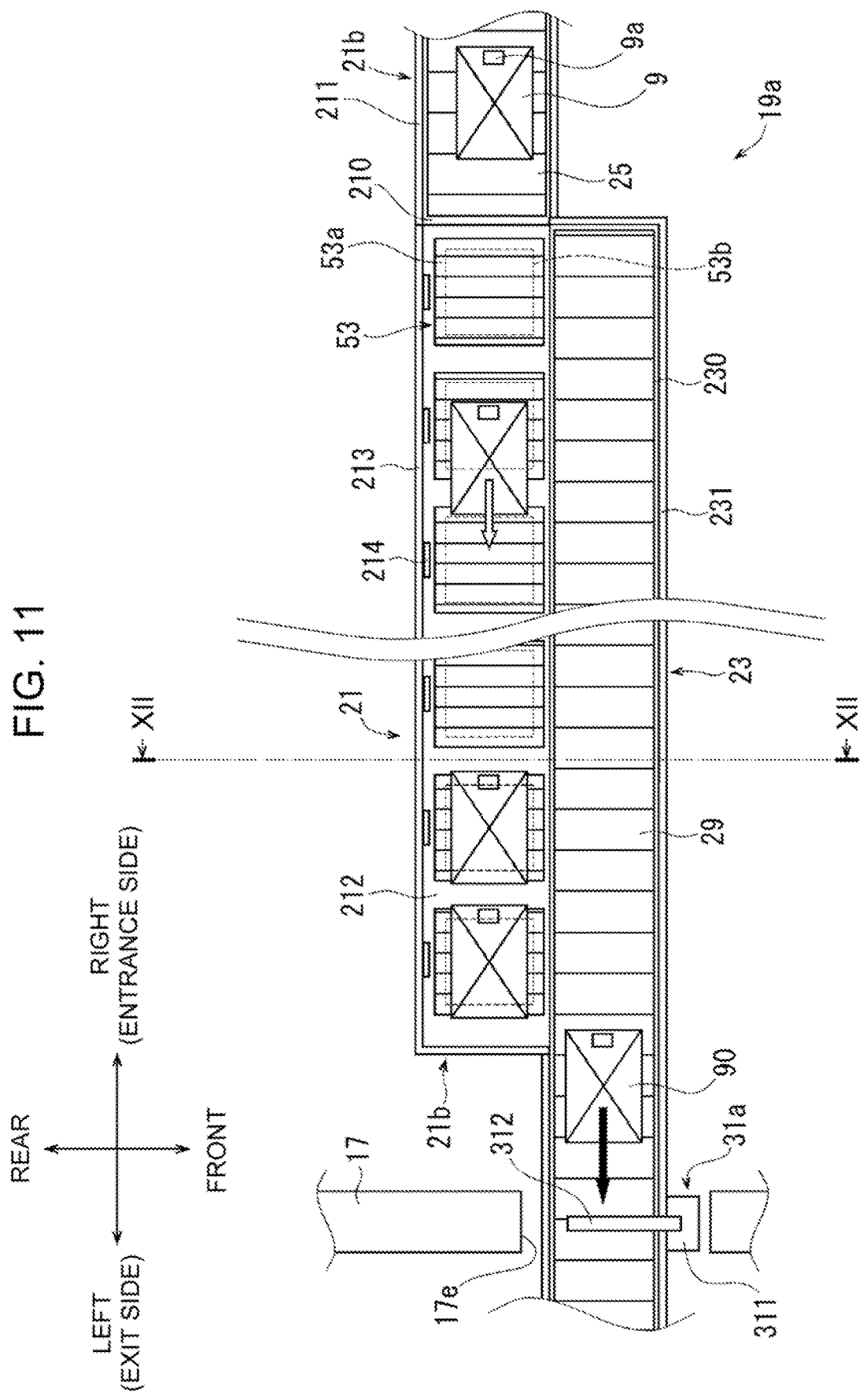
FIG. 11 is a top view illustrating a storage rack, a transfer rack, first to third moving units, and others of a warehouse system according to a fifth embodiment.

As illustrated in FIG. 11, in a warehouse system according to a fifth embodiment, a plurality of fourth belt conveyer devices 53 is provided on a second floor face 212 of a rack body 21b as alternatives to the third belt conveyor devices 51 according to the fourth embodiment. The number of the fourth belt conveyer devices 53 is the same as the number of the items 9 that can be stored on the rack body 21b. The warehouse system also includes no pushing mechanism 33. Also, in the warehouse system, the first belt conveyer device 25 solely forms the "the first moving unit".

The fourth belt conveyer devices 53 are also an example of "the conveyer device" of the present invention. The fourth belt conveyer devices 53 are controllable individually by the work computer 7 illustrated in FIG. 1. That is, in the warehouse system, the fourth belt conveyer devices 53 and the work computer 7 form "the third moving unit" of the present invention. The fourth belt conveyer devices 53 function also as "the resting device" of the present invention.

As illustrated in FIG. 11, the fourth belt conveyer devices 53 are provided on the second floor face 212 as is the case of the third belt conveyor devices 51. Each of the fourth belt conveyer devices 53 includes a conveyer body 53a and an actuator mechanism 53b. The conveyer bodies 53a are configured to transfer the items 9 that have been transferred through the introducing section 21a toward the first exit 17e along the rack body 21b.

Figure 12:
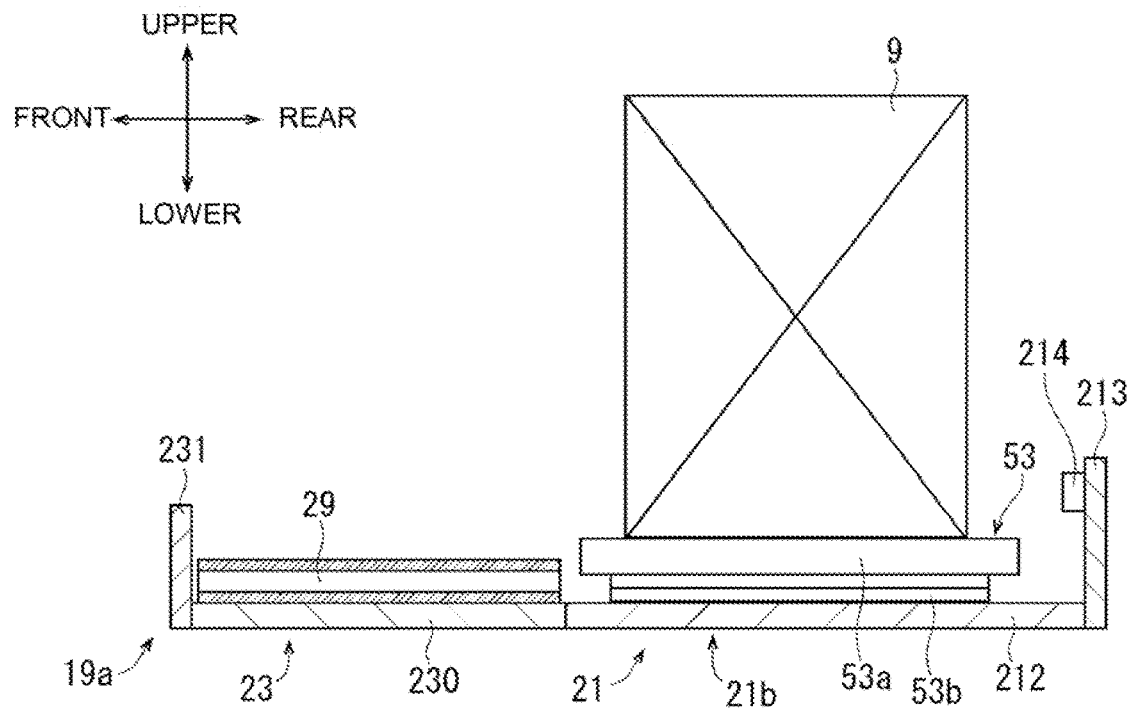
FIG. 12 is a cross-sectional view of the warehouse system according to the fifth embodiment taken along line XII of FIG. 11.
Figure 13:
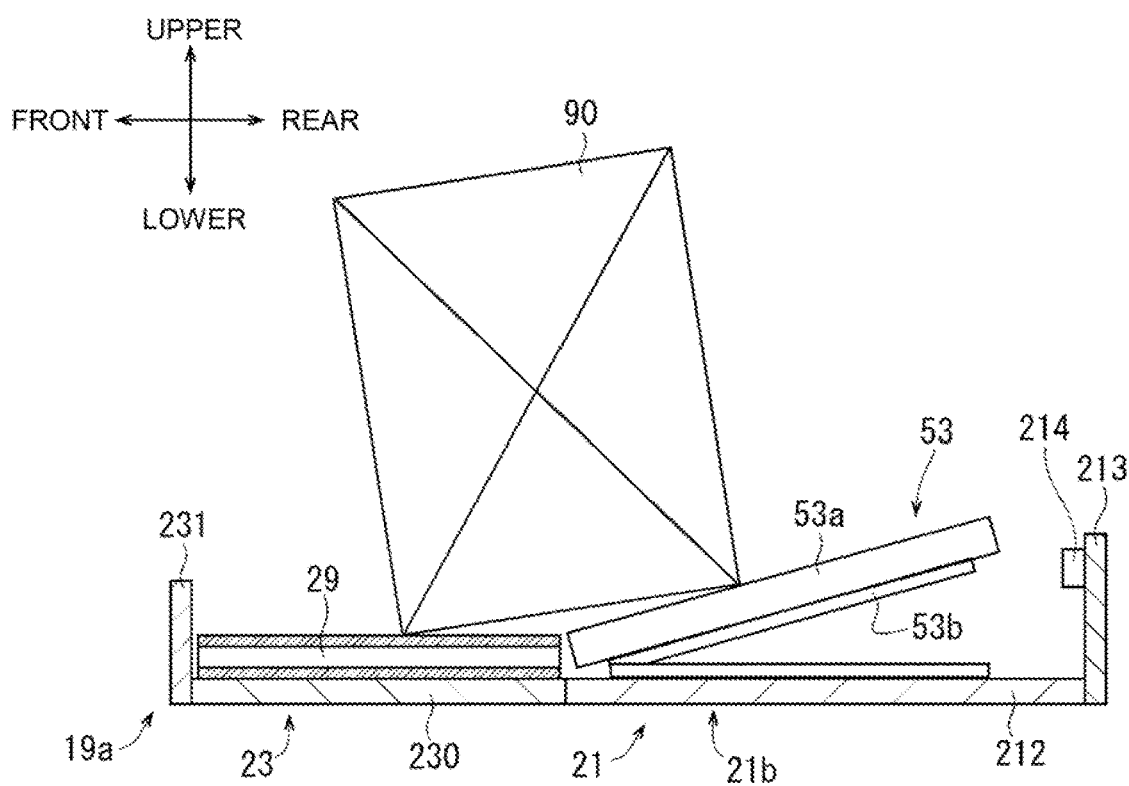
FIG. 13 is a cross-sectional view similar to FIG. 12 of the warehouse system according to the fifth embodiment, illustrating a state in which a selected article is transferred from the storage rack to the transfer rack.

As illustrated in FIGS. 12 and 13, the actuator mechanism 53b is mounted on the conveyer body 53a and disposed between the conveyer body 53a and the second floor face 212. The position of the actuator mechanism 53b is changeable between a flat state in which the conveyer body 53a is parallel to the second floor face 212 as illustrated in FIG. 12 and a sloped state in which the conveyer body 53a is sloped relative to the second floor face 212 as illustrated in FIG. 13. When the actuator mechanism 53b is in the sloped state, the conveyer body 53a is sloped downward from the storage rack 21 side toward the transfer rack 23 side.

In each of the fourth belt conveyer devices 53, when the actuator mechanism 53b enters the flat state, the fourth belt conveyer device 53 is switched the first moving state. Meanwhile, in each of the fourth belt conveyer devices 53, when the actuator mechanism 53b enters the sloped state, the fourth belt conveyer device 53 is switched to the second moving state. Other configurations of the warehouse system are similar to those of the warehouse system according to the first embodiment.

In the warehouse system also, when the storing operation of the items 9 is performed, for example, as illustrated in FIG. 11, the items 9 that are carried in through the first entrance 17a are moved toward the rack body 21b along the introducing section 21a of the storage rack 21 by the first belt conveyer device 25. Here, the state of the fourth belt conveyer devices 53 that are present in the first rack unit 19a is switched to the first moving state by the work computer 7. Accordingly, the items 9 that are delivered to the rack body 21b by the first belt conveyer device 25 are then moved toward the first exit 17e on the rack body 21b by the fourth belt conveyer devices 53. Then, the work computer 7 causes the fourth belt conveyer devices 53 to stop individually based on the positional information from the detection sensors 214. In this way, in the warehouse system also, on the rack body 21b, the items 9 are sequentially stored at predetermined intervals between them in the right and left direction, as is the case of the warehouse system according to the first embodiment. Also, in the warehouse system, one item 9 is to be placed on each of the fourth belt conveyor devices 53, as is the case of the warehouse system according to the fourth embodiment.

Next, when the carrying-out operation of the selected items 90 is performed, the operator operates the work computer 7 to change the position of only the fourth belt conveyer device 53 on which the selected item 90 is placed to the sloped state, as illustrated in FIG. 13. Accordingly, the state of the fourth belt conveyor device 53 on which the selected item 90 is placed is switched to the second moving state. Accordingly, the selected item 90 is transferred from the rack body 21b to the transfer rack 23 while being slid down along the conveyer body 51a. In this way, the selected items 90 are carried out through the first to fourth exits 17e-17h and finally delivered to the receiving area 13, as is the case of the warehouse system according to the first embodiment. After the selected item 90 is transferred to the transfer rack 23, the work computer 7 changes the position of the actuator mechanism 53b to the flat state as illustrated in FIG. 12, and switches the state of the fourth belt conveyer devices 53 to the first moving state.

As described above, in the warehouse system also, the first and second belt conveyor devices 25, 29 and the fourth belt conveyor devices 53 are operated independently from each other while being controlled by the work computer 7. With the configuration of the warehouse system, the storing operation of the items 9 that are carried in through the first to fourth entrances 17a-17d and the carrying-out operation of the selected items 90 may be performed simultaneously. In the warehouse system, gravity may be utilized when transferring the selected items 90 from the rack body 21b to the transfer rack 23. Thus, no motive power for the conveyer body 53a is required when transferring the selected items 90 from the rack body 21b to the transfer rack 23. Other effects of the warehouse system are similar to those of the warehouse systems according to the first and fourth embodiments.

Sixth Embodiment

Figure 14:
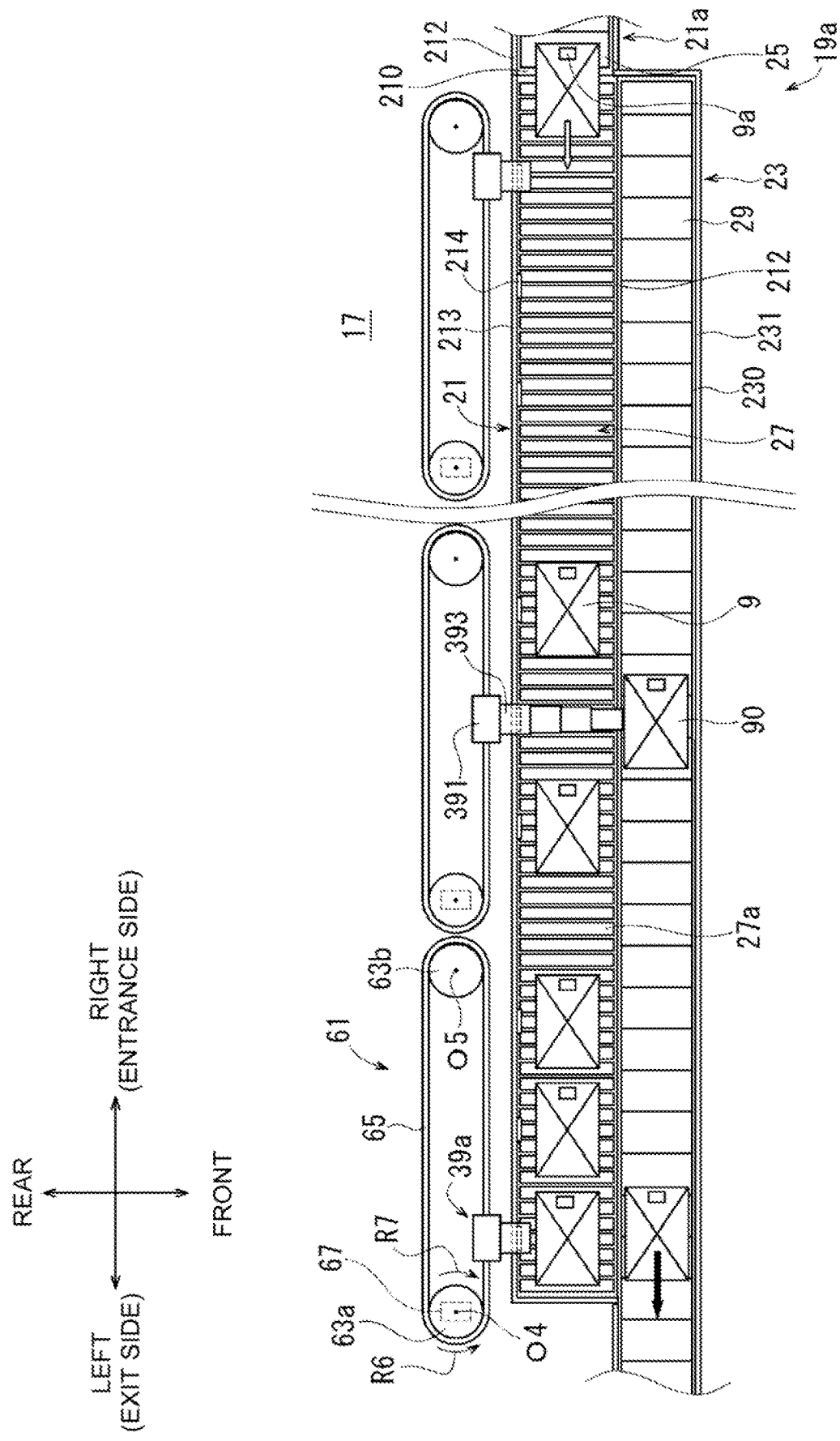
FIG. 14 is a top view illustrating a storage rack, a transfer rack, first to third moving units, and others of a warehouse system according to a sixth embodiment.

As illustrated in FIG. 14, in a warehouse system according to a sixth embodiment, a plurality of pushing mechanisms 61 is provided as alternatives to the pushing mechanisms 33 of the warehouse system according to the first embodiment. The pushing mechanisms 61 are also an example of "the third moving unit" of the present invention.

The pushing mechanisms 61 are mounted in the housing 17 and disposed on the rear side of each of the first to fourth rack units 19a-19d. A plurality of the pushing mechanisms 61 is provided for each of the rear side of the first to fourth rack units 19a-19d. Also, the pushing mechanisms 61 are controllable by the work computer 7 illustrated in FIG. 1. A configuration will be described hereafter based on the pushing mechanisms 61 disposed on the rear side of the first rack unit 19a.

As illustrated in FIG. 14, the pushing mechanisms 61 are arranged in a line in the extending direction of the storage rack 21, i.e., in the right and left direction. Each of the pushing mechanisms 61 includes first and second sprockets 63a, 63b, a roller chain 65, and a first pushing device 39a.

In the warehouse system, the first pushing device 39a functions as "the pushing device" of the present invention.

The first sprocket 63a and the second sprocket 63b are arranged in the right and left direction at a predetermined interval. More specifically, the first sprocket 63a and the second sprocket 63b are spaced apart in the right and left direction by a distance corresponding to three items 9. It is to be noted the distance between the first sprocket 63a and the second sprocket 63b in the right and left direction may be designed appropriately.

A third actuator motor 67 is mounted to the first sprocket 63a. The third actuator motor 67 is controllable by the work computer 7. The third actuator motor 67 is configured to turn the first sprocket 63a around a rotational axis O4 that extends perpendicularly in the up and down direction. With this configuration, the first sprocket 63a is turnable in R6 or R7 direction around the rotational axis O4. The second sprocket 63b is rotatable around a rotational axis O5 that extends parallel to the rotational axis O4. The second sprocket 63b is turnable in R6 or R7 direction, following the first sprocket 63a. It is noted that the third actuator motor 67 is not mounted to the second sprocket 63b.

The roller chain 65 is made of metal. The roller chain 65 is wrapped around the first sprocket 63a and the second sprocket 63b. With this configuration, by turning the first and second sprockets 63a, 63b in R6 direction, the roller chain 65 rotates in R6 direction between the first sprocket 63a and the second sprocket 63b. On the other hand, by turning the first and second sprockets 63a, 63b in R7 direction, the roller chain 65 rotates in R7 direction between the first sprocket 63a and the second sprocket 63b. In the warehouse system, the first and second sprockets 63a, 63b, the third actuator motor 67, and the roller chain 65 form "the guide device" of the present invention.

The first pushing device 39a is fixed to the roller chain 65. Also, in the warehouse system, the device body 391 of the first pushing device 39a does not have the guide roller 40a, the first and second driven rollers 40b, 40c, and the first actuator motor 40d.

By the rotation of the roller chain 65 between the first sprocket 63a and the second sprocket 63b, the first pushing device 39a moves between the first sprocket 63a and the second sprocket 63b horizontally in the right and left direction relative to the storage rack 21. More specifically, when the roller chain 65 rotates in R6 direction, the first pushing device 39a moves horizontally to the right relative to the storage rack 21. Meanwhile, when the roller chain 65 rotates in R7 direction, the first pushing device 39a moves horizontally to the left relative to the storage rack 21. The first sprocket 63a and the second sprocket 63b are spaced apart in the right and left direction by a distance corresponding to three items 9, so that the first pushing device 39a is movable between the first sprocket 63a and the second sprocket 63b in the right and left direction by the distance corresponding to three items 9. Other configurations of the warehouse system are similar to those of the warehouse system according to the first embodiment.

In the warehouse system also, on the rack body 21b, the items 9 are sequentially stored at predetermined intervals between them in the right and left direction, as is the case of the warehouse system according to the first embodiment. Here, in the warehouse system, the intervals between the items 9 stored on the rack body 21b in the right and left direction is adjusted according to the movable range of the first pushing device 39a of each of the pushing mechanisms 61 in the right and left direction.

When performing the carrying-out operation of the selected items 90, the work computer 7 selects the pushing mechanism 61 at the position corresponding to the selected item 90 on the rack body 21b. Then, the work computer 7 actuates the third actuator motor 67 of the selected pushing mechanism 61 to turn the first sprocket 63a in R6 or R7 direction to thereby move the first pushing device 39a to the rear side of the selected item 90. Then, the first pushing device 39a extends a rod 393 as is the case of the warehouse system according to the first embodiment. Thus, the rod 393 pushes the selected item 90 to transfer the selected item 90 from the rack body 21b to the transfer rack 23. In the warehouse system, the selected items 90 are also carried out through the first to fourth exits 17e-17h and finally delivered to the receiving area 13.

In the warehouse system, the first and second belt conveyer devices 25, 29, the roller conveyer device 27, and the pushing mechanisms 61 are operated independently from each other while being controlled by the work computer 7. With the configuration of the warehouse system, the storing operation of the items 9 that are carried in through the first to fourth entrances 17a-17d and the carrying-out operation of the selected items 90 may be performed simultaneously. Also, in the warehouse system, the configuration of the pushing mechanisms 61 is simplified as compared with the warehouse system according to the first embodiment and thus, it is possible to reduce the cost. Other effects of the warehouse system are similar to those of the warehouse system according to the first embodiment.

Although the present invention has been described based on the first to sixths embodiments, it should not be construed that the present invention is limited to the first to sixth embodiments. Rather, the present invention may be modified appropriately within the gist of the present invention.

For example, in the warehouse system according to the fourth embodiment, in addition to the third belt conveyor devices 51, a conveyer device dedicated to transfer, which is configured to transfer the item 9 or the selected item 90 only in the right and left direction along the rack body 21b, may be provided on the second floor face 212. In this case, it is possible to reduce the number of the third belt conveyor devices 51 to a number smaller than the number of the items 9 that can be stored on the rack body 21b. Furthermore, when the item 9 placed on the conveyer device dedicated to transfer turns to the selected item 90, the conveyer device dedicated to transfer transfers the selected item 90 to the third belt conveyor device 51. Thus, it is possible to transfer the selected item 90 from the rack body 21b to the transfer rack 23 by the third belt conveyor device 51. The same applies to the warehouse system according to the fifth embodiment.

In the warehouse system according to the fifth embodiment, each item 9 may be stored on the rack body 21b in a state in which the item 9 is placed on a cart or the like having casters so that the selected item 90 can be transferred from the rack body 21b to the transfer rack 23 in a suitable manner by the fourth belt conveyer device 53.

Also, in the warehouse system according to the sixth embodiment, in each of the first to fourth rack units 19a-19d, a plurality of pushing mechanisms 61 may be arranged in the height direction.

Also, in the warehouse system according to the sixth embodiment, in each of the first to fourth rack units 19a-19d, the pushing mechanisms 61 may be arranged in parallel in the extending direction of the storage rack 21.

In the warehouse system according to the sixth embodiment, the pushing mechanisms 61 are arranged in a line in the extending direction of the storage rack 21. However, the configuration is not limited thereto. One pushing mechanism 61 may be provided to each of the first to fourth rack units 19a-19d by arranging the first sprocket 63a and the second sprocket 63b spaced apart by a distance substantially equal to the length of the rack body 21b in the right and left direction.

Furthermore, in the warehouse system according to the sixth embodiment, each pushing mechanism 61 may include the first pushing device 45a of the warehouse system according to the second embodiment, or the first pushing device 47a of the warehouse system according to the third embodiment, as an alternative to the first pushing device 39a.

In the warehouse system according to the first embodiment, in each roller conveyer device 27, all of the transfer rollers 27a are rotated individually by the motor. However, the roller conveyer device 27 is not limited thereto. The roller conveyer device 27 include transfer rollers 27a that are rotated by a motor and driven rollers that are rotated following the transfer rollers 27a. In this case, each group of the roller conveyer device 27 illustrated in FIG. 3 is formed by the transfer rollers 27a and the driven rollers.

Furthermore, in the warehouse system according to the fourth embodiment, the third belt conveyer devices 51 may be provided also to the introducing section 21a instead of the first belt conveyer device 25. In this case, the third belt conveyor devices 51 provided to the introducing section 21a function as "the first moving unit" of the present invention.

Furthermore, in the warehouse system according to the fifth embodiment, the fourth belt conveyer devices 53 may be provided also to the introducing section 21a instead of the first belt conveyer device 25. In this case, the fourth belt conveyor devices 53 provided to the introducing section 21a function as "the first moving unit" of the present invention.

INDUSTRIAL APPLICABILITY

The present invention is applicable to a logistics system.

REFERENCE SIGNS LIST

7 . . . work computer (selection unit, control device, restriction unit)
9 . . . item (article)
17a-17d . . . first to fourth entrances (entrances)
17e-17h . . . first to fourth exits (exits)
21 . . . storage rack
21a . . . introducing section
21b . . . rack body
23 . . . transfer rack
25 . . . first belt conveyer device (first moving unit)
27 . . . roller conveyer device (first moving unit, resting device, restriction unit)
29 . . . second belt conveyer device (second moving unit)
33 . . . pushing mechanism (third moving unit)
35a, 35b . . . first post, second post (guide device)
40a . . . guide roller (guide device)
40b, 40c . . . first driven roller, second driven roller (guide device)
40d . . . first actuator motor (guide device)
41 . . . guide rail group (guide device)
43 . . . pushing device group (pushing device)
51 . . . third belt conveyer device (third moving unit, conveyer device, resting device, restriction unit)
53 . . . fourth belt conveyer device (third moving unit, conveyer device, resting device, restriction unit)
61 . . . pushing mechanism (third moving unit)

63a, 63b . . . first sprocket, second sprocket (guide device)
65 . . . roller chain (guide device)
67 . . . third actuator motor (guide device)
90 . . . selected item (selected article)
212 . . . second floor face (floor face)
214 . . . detection sensor (detection device, restriction unit)
391 . . . device body
393 . . . rod
451 . . . device body
453 . . . first chain
455 . . . second chain
471 . . . device body
473 . . . pushing plate
475 . . . link mechanism
L1 . . . first length
L2 . . . second length

The invention claimed is:

1. A warehouse system in which a plurality of articles is carried in and stored, and from which selected articles that are to be carried out are carried out, the selected articles being the articles that are selected from among the stored articles, the warehouse system comprising:
an entrance through which the articles are carried in;
an exit through which the selected articles are carried out;
a plurality of storage racks extending in an extending direction, from an entrance side toward an exit side, and on which the articles are stored, the plurality of storage racks are arranged in layers in a height direction;
a plurality of transfer racks disposed next to and at a same height as the plurality of storage racks, extending from the entrance side toward the exit side in parallel to the plurality of storage racks, and on which the selected articles are to be placed;
a selection unit configured to select the selected articles from among the articles stored on the plurality of storage racks;
a plurality of first moving units configured to move the articles in the extending direction of the plurality of storage racks on the plurality of storage racks, the plurality of first moving units being at the height of the plurality of storage racks;
a plurality of second moving units configured to be operated independently from the plurality of first moving units and to move the selected articles toward the exit side on the plurality of transfer racks, the plurality of second moving units being at the height of the plurality of first moving units; and
a plurality of third moving units configured to be operated independently from the plurality of first moving units and the plurality of second moving units and to transfer the selected articles from a storage rack of the plurality of storage racks to a transfer rack of the plurality of transfer racks, the plurality of third moving units being at the height of the plurality of first moving units and second moving units,
wherein each one of the plurality of third moving units includes:
a plurality of pushing devices configured to push the selected articles toward the transfer rack;
a guide rail that extends parallel to the extending direction and configured to guide the pushing device in the extending direction of the plurality of storage racks; and
a control device configured to control the pushing device to move along the guide rail,
wherein each one of the third moving units operates independently from other ones of the third moving units, and
wherein each one of the pushing devices of each one of the third moving units moves in the extending direction along the guide rail independently from the other ones of the pushing devices of a same third moving unit and a different third moving unit.

2. The warehouse system according to claim 1, wherein each one of the plurality of third moving units includes a guide device; and
each of the plurality of pushing devices includes:
a device body mounted to the guide device; and
a rod that is disposed in the device body, extendable in an axial direction, and configured to push the selected articles,
the rod is extendable and retractable between a first length and a second length that is greater than the first length, and
the rod is configured to push the selected articles while extending to the second length.

3. The warehouse system according to claim 1, wherein each one of the plurality of third moving units includes a guide device; and
each of the plurality of pushing devices includes:
a device body mounted to the guide device; and
a first chain and a second chain that are disposed in the device body, and
the first chain and the second chain extend toward the selected articles while coming into mesh each other from a state in which the first chain and the second chain are at least partially separated from each other to push the selected articles.

4. The warehouse system according to claim 1, wherein each one of the plurality of third moving units includes a guide device; and
each of the plurality of pushing devices includes:
a device body that is mounted to the guide device;
a pushing plate having a plate shape; and
a link mechanism that connects the device body and the pushing plate and supports the pushing plate,
a shape of the link mechanism is changeable between a first state and a second state in which the link mechanism extends further than the first state toward the selected articles, and
the pushing plate pushes the selected articles by changing the shape of the link mechanism from the first state to the second state.

5. The warehouse system according to claim 1, wherein the plurality of pushing devices are arranged in a height direction of the articles in such a manner that the plurality of pushing devices are movable relative to each other.

6. The warehouse system according to claim 1, wherein the plurality of pushing devices are arranged in parallel in the extending direction of the plurality of storage racks in such a manner that the plurality of pushing devices are movable relative to each other.

7. The warehouse system according to claim 1, further comprising a restriction unit configured to restrict the articles on the storage rack from being transferred to the transfer rack together with the selected articles.

8. The warehouse system according to claim 7, wherein the restriction unit includes:
a detection device configured to detect positions of the articles on the storage rack as positional information; and a resting device configured to rest the articles on the storage rack while providing a specified distance between the articles in the extending direction of the storage rack based on the positional information.

\* \* \* \* \*